US006649004B2

(12) United States Patent
Kita et al.

(10) Patent No.: US 6,649,004 B2
(45) Date of Patent: Nov. 18, 2003

(54) OPTICAL DISK, METHOD OF FORMING IMAGE ON OPTICAL DISK, IMAGE FORMING APPARATUS AND ADHESIVE LAYER TRANSFER SHEET

(75) Inventors: Tatsuya Kita, Tokyo-To (JP); Naoji Shibasaki, Tokyo-To (JP); Takeshi Ueno, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 191 days.

(21) Appl. No.: 09/820,307

(22) Filed: Mar. 29, 2001

(65) Prior Publication Data

US 2001/0010851 A1 Aug. 2, 2001

Related U.S. Application Data

(62) Division of application No. 09/055,257, filed on Apr. 6, 1998, now abandoned, which is a division of application No. 08/587,948, filed on Jan. 17, 1996, now Pat. No. 5,798,161.

(30) Foreign Application Priority Data

Jan. 20, 1995 (JP) ............................................ 7-026126
Jun. 6, 1995 (JP) ............................................ 7-163038

(51) Int. Cl.[7] .......................... B44C 1/65; B32B 31/20; B41M 3/12; B41J 2/315; B41J 11/00

(52) U.S. Cl. ....................... 156/230; 156/235; 156/240; 156/247; 156/277; 156/289; 427/146; 427/148; 428/42.1; 428/195; 428/201; 428/914; 400/120.01; 400/120.03; 347/176

(58) Field of Search ................................ 156/230, 233, 156/235, 238, 240, 241, 247, 277, 288, 540, 581, 582, 583, 583.4; 427/146, 147, 148, 162, 164; 428/42.1, 42.3, 195, 200, 201, 207, 914; 400/120.01, 120.03, 120.04, 120.16, 48; 347/171, 173, 174

(56) References Cited

U.S. PATENT DOCUMENTS 3,411,978 A 11/1968 Frohbach .................. 428/42.3

(List continued on next page.)

FOREIGN PATENT DOCUMENTS

| | | | | |
|---|---|---|---|---|
| DE | 3935345 A1 | * | 4/1991 | ............ B41M/5/26 |
| JP | 02-160556 | * | 6/1990 | |
| JP | 4-158069 | | 6/1992 | |
| JP | 08-48080 | * | 2/1996 | ............ B41M/5/38 |
| JP | 08-180642 | * | 7/1996 | ........... G11B/23/38 |

*Primary Examiner*—J. A. Lorengo
(74) *Attorney, Agent, or Firm*—Parkhurst & Wendel, L.L.P.

(57) ABSTRACT

An image forming method for forming an image on an optical disk includes forming the image on an intermediate transfer medium or on an image receptive layer separably formed on one surface of the intermediate transfer medium. The intermediate transfer medium and the optical disk are laid so that the surface of the intermediate transfer medium carrying the image and the surface of the optical disk are in close contact with each other. Heat and/or pressure is applied to the intermediate transfer medium to transfer the image or the image receptive layer carrying the image to the optical disk to form a label on the optical disk.

3 Claims, 15 Drawing Sheets

U.S. PATENT DOCUMENTS 3,721,557 A 3/1973 Inoue ........................ 96/28
3,898,357 A 8/1975 Miller ........................ 428/42.3
3,936,570 A 2/1976 Iwata ........................ 528/349
4,012,552 A 3/1977 Watts ........................ 428/200
4,107,365 A 8/1978 Reed ........................ 428/202
4,465,489 A 8/1984 Jenkins et al. ................ 8/471
4,912,561 A * 3/1990 Honda ........................ 358/296
4,923,848 A 5/1990 Akada et al. ................ 503/227
5,006,502 A 4/1991 Fujimura et al. ........... 503/227
5,053,788 A * 10/1991 Tohdo ........................ 346/1.1
5,055,444 A 10/1991 Kaszczuk ................... 503/227
5,260,256 A 11/1993 Takahara et al. ............ 503/227
5,316,464 A * 5/1994 Lexell ........................ 425/318
5,344,681 A 9/1994 Calhoun .................... 428/42.3
5,416,500 A * 5/1995 Tohdo ........................ 347/171
5,423,619 A * 6/1995 Kohno ........................ 400/525
5,483,321 A * 1/1996 Cahill et al. ................ 355/200
5,542,768 A * 8/1996 Rother et al. .......... 400/120.16
5,573,831 A 11/1996 Suzuki et al. .............. 428/64.1
5,575,877 A * 11/1996 Hale et al. .................. 156/240
5,583,555 A * 12/1996 Tabasso ...................... 347/213
5,587,214 A 12/1996 Mitchell .................... 428/42.3
5,668,585 A * 9/1997 Brechko ..................... 347/220
5,691,020 A 11/1997 Kondoh ..................... 428/42.3
6,019,151 A * 2/2000 Wen et al. .................. 156/387
6,071,596 A 6/2000 Kawai et al. ............... 428/195
6,312,174 B1 * 11/2001 Drynkin et al. ........ 400/120.16

* cited by examiner

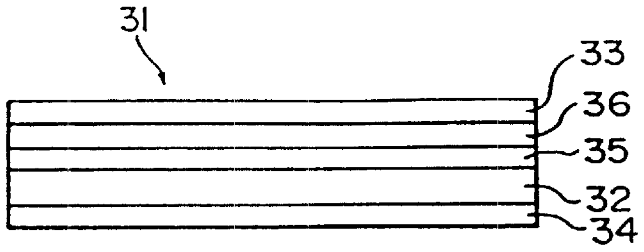
FIG. 3
FIG. 4 (A)
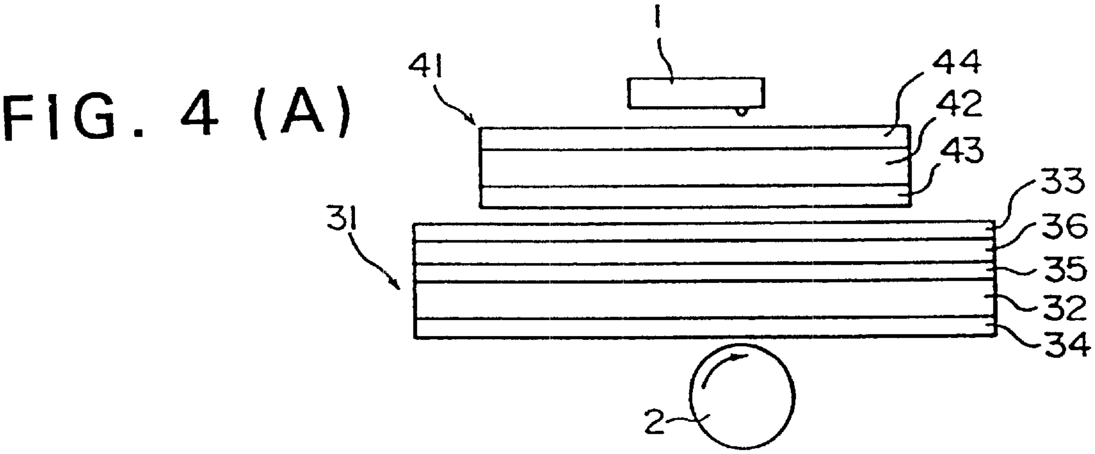
FIG. 4 (B)
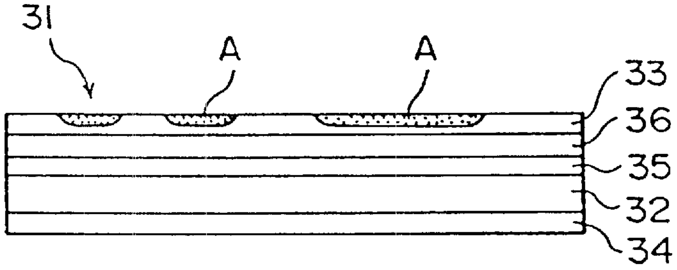

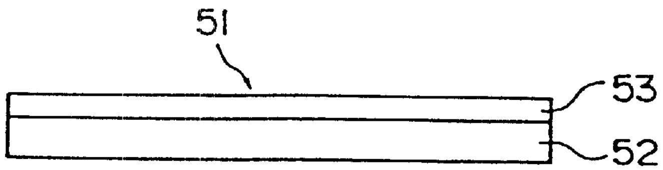
FIG. 9
FIG. 10 (A)
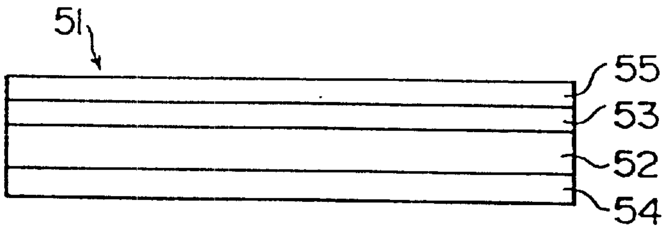
FIG. 10 (B)
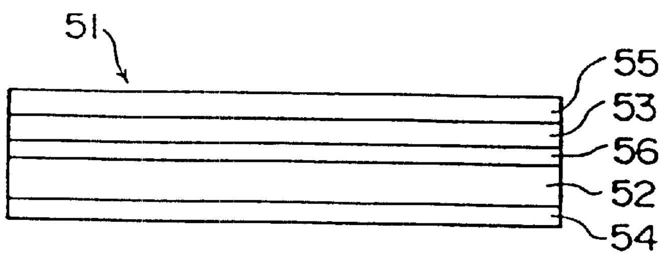

OPTICAL DISK, METHOD OF FORMING IMAGE ON OPTICAL DISK, IMAGE FORMING APPARATUS AND ADHESIVE LAYER TRANSFER SHEET

This is a Division of application Ser. No. 09/055,257 filed Apr. 6, 1998 now abandoned, which in turn is a Division of Ser. No. 08/587,948, filed Jan. 17, 1996, now U.S. Pat. No. 5,798,161 issued Aug. 25, 1998.

BACKGROUND OF THE INVENTION

1. Field of the Invention

The present invention relates to an optical disk provided on its back surface opposite the recording/reproducing surface with an image including pictures, characters and/or symbols, a method of forming such an image on an optical disk, an image forming apparatus for carrying out the method of forming an image on an optical disk, and an adhesive layer transfer sheet to be employed in carrying out the method of forming an image on an optical disk.

2. Description of the Related Art

An optical disk, such as a compact disk, a laser disk, a magnetooptic disk or a phase change optical disk, has the front surface serving as a recording surface or a reproducing surface, and the back surface provided with a label in which an image for identifying the optical disk or giving decorative effect to the optical disk is formed. Usually, the image is formed by screen printing or offset printing. When printing an image to form a label on an optical disk by screen printing or offset printing, a printing plate needs to be prepared for each image, increasing printing costs when printing the label on a small lot of optical disks, the printing plate needs to be changed or cleaned to remove the ink every time the image is changed, requiring troublesome processes, reducing productivity and increasing printing costs when printing the label on a small lot of optical disks, screen printing and offset printing are unable to print images in a high resolution and a high sharpness, and it is difficult to form sharp full-color pictures by screen printing or offset printing.

SUMMARY OF THE INVENTION

The present invention has been made in view of such problems and it is therefore an object of the present invention to provide an optical disk provided with a clear, highly sharp image including pictures, characters and/or symbols.

Another object of the present invention is to provide a simple method of forming such an image on an optical disk.

A further object of the present invention is to provide an image forming apparatus for carrying out such a simple method of forming such an image on an optical disk.

A still further object of the present invention is to provide an adhesive layer transfer sheet to be employed in carrying out the aforesaid method of forming an image on an optical disk.

According to a first aspect of the present invention, an optical disk provided on one surface thereof with a label is obtained by a method comprising the steps of: forming an image on an intermediate transfer medium by a thermal transfer process; and transferring the image from the intermediate transfer medium onto the surface of the optical disk to form the label on the optical disk.

According to a second aspect of the present invention, an optical disk provided on one surface thereof with an image receptive layer carrying an image and forming a label is obtained by a method comprising the steps of: forming the image on the image receptive layer of an intermediate transfer medium by a thermal transfer process; and transferring the image receptive layer carrying the image from the intermediate transfer medium onto the surface of the optical disk to form the label on the surface of the optical disk.

According to a third aspect of the present invention, a method of forming an image on an optical disk comprises the steps of: forming the image on one surface of an intermediate transfer medium by transferring a coloring matter from a thermal transfer sheet having a color layer by a thermal transfer process; laying the intermediate transfer medium and the optical disk one on top of the other with the image formed on the intermediate transfer medium in close contact with the surface of the optical disk; and transferring the image onto the surface of the optical disk by applying heat and/or pressure to the intermediate transfer medium.

According to a fourth aspect of the present invention, a method of forming an image on an optical disk comprises the steps of: forming the image on an image receptive layer formed on an intermediate transfer medium by transferring a coloring matter from a thermal transfer sheet provided on its surface with a color layer to the image receptive layer of the intermediate transfer medium by a thermal transfer process; laying the intermediate transfer medium and the optical disk one on top of the other with the image receptive layer in close contact with one surface of the optical disk; and transferring the image receptive layer from the intermediate transfer medium to the optical disk by applying heat and/or pressure to the intermediate transfer medium by a transfer means.

According to a fifth aspect of the present invention, an adhesive layer transfer sheet comprises: a base sheet; and an adhesive layer formed on one surface of the base sheet and capable of being peeled off the base sheet.

According to a sixth aspect of the present invention, an adhesive layer transfer sheet comprises: a base sheet; a white layer formed on one surface of the base sheet and capable of being peeled off the base sheet; and an adhesive layer formed on the white layer.

According to a seventh aspect of the present invention, a thermal transfer sheet comprises: a thermal transfer base sheet; a color layer formed on one surface of the thermal transfer base sheet; and an adhesive layer formed on the same surface of the thermal transfer base sheet contiguously with the color layer and capable of being peeled off the thermal transfer base sheet.

According to an eighth aspect of the present invention, an intermediate transfer medium comprises: a transfer base sheet; an image receptive layer formed on one surface of the transfer base sheet and capable of being peeled off the transfer base sheet; and an adhesive layer formed on one surface of the transfer base sheet contiguously with the image receptive layer and capable of being peeled off the transfer base sheet.

According to a ninth aspect of the present invention, a method of forming an image on an optical disk comprises the steps of: preparing a thermal transfer sheet comprising a thermal transfer base sheet and at least a color layer formed on one surface of the thermal transfer base sheet, and an intermediate transfer medium comprising an intermediate transfer base sheet and at least an image receptive layer formed on one surface of the intermediate transfer base sheet; forming the image on the image receptive layer of the intermediate transfer medium by laying the thermal transfer sheet and the intermediate transfer medium one on top of the other with the color layer and the image receptive layer in close contact with each other, compressing the thermal transfer sheet and the intermediate transfer medium between a thermal head and a platen roller, and selectively energizing the heating elements of the thermal head according to image data to transfer a thermomigratory coloring matter contained in the color layer of the thermal transfer sheet from the color layer of the thermal transfer sheet to the image receptive layer of the intermediate transfer medium; and transferring the image receptive layer carrying the image from the intermediate thermal transfer medium to the optical disk by heating the intermediate transfer medium pressed against the optical disk.

According to a tenth aspect of the present invention, an image forming apparatus for forming an image on an optical disk comprises: thermal transfer sheet conveying means for conveying a thermal transfer sheet comprising a thermal transfer base sheet and at least a color layer formed on one surface of the thermal transfer base sheet; intermediate transfer medium conveying means for conveying an intermediate transfer medium comprising an intermediate transfer base sheet and at least an image receptive layer formed on one surface of the intermediate transfer base sheet; image forming means comprising a thermal head and a platen roller, for forming the image on the image receptive layer by laying the thermal transfer sheet and the intermediate transfer medium one on top of the other with the color layer and the image receptive layer in close contact with each other, compressing the combination of the thermal transfer sheet and the intermediate transfer medium between the thermal head and the platen roller, and selectively energizing the heating elements of the thermal head according to image data to transfer a thermomigratory coloring matter contained in the color layer from the color layer to the image receptive layer; and image receptive layer transferring means comprising a heating means, for transferring the image receptive layer carrying the image to the optical disk by laying the intermediate transfer medium having the image receptive layer carrying the image and the optical disk one on top of the other, and heating intermediate transfer medium by the heating means.

According to an eleventh aspect of the present invention, an image forming apparatus for forming an image on an optical disk comprises: intermediate transfer medium conveying means for conveying an intermediate transfer medium comprising an intermediate transfer base sheet and at least an image receptive layer carrying the image formed of a thermomigratory coloring matter contained in the image receptive layer; and image receptive layer transfer means comprising heating means, for transferring the image receptive layer of the intermediate transfer medium to the optical disk by laying the intermediate transfer medium and the optical disk one on top of the other and heating the intermediate transfer medium by the heating means.

According to the present invention, an image is formed on an intermediate transfer medium or on an image receptive layer formed on an intermediate transfer medium and capable of being peeled off the intermediate transfer medium by a thermal transfer process on the basis of image data produced by using a computer or the like. Accordingly, a clear, highly sharp image can be formed on the intermediate transfer medium, and the image or the image receptive layer carrying the image can be transferred intactly to an optical disk to form a label having the image on the optical disk.

The above and other objects, features and advantages of the present invention will become more apparent from the following description taken in connection with the accompanying drawings.

BRIEF DESCRIPTION OF THE DRAWINGS

FIG. 3 is a schematic sectional view of an intermediate transfer medium in an example;

FIGS. 4(A)–(B) are schematic views for explaining a method of forming an image on an optical disk, using an adhesive layer, in accordance with the present invention;

FIG. 9 is a view of an adhesive layer transfer sheet in accordance with the present invention;

FIGS. 10*a–b* are views of adhesive layer transfer sheets in accordance with the present invention;

DETAILED DESCRIPTION OF THE PREFERRED EMBODIMENTS

First Embodiment

An optical disk in a first embodiment according to the present invention is provided at least on one surface thereof with an image transferred thereto from an intermediate transfer medium by a thermal transfer method. The present invention may employ a thermal transfer method of either of hot-melt transfer system and hot-sublimation transfer system.

A thermal transfer method of hot-melt transfer system is an image recording method that uses a thermal transfer sheet formed by coating a base sheet, such as a plastic film, with a layer of a hot-melt ink prepared by dispersing a coloring matter, such as a pigment, in a binder, such as hot-melt wax or resin, and transfers the coloring matter together with the binder to a recording medium, such as a paper sheet or a plastic sheet by selectively energizing the heating elements of a heating device, such as a thermal head, according to image information. Images recorded by the hot-melt transfer system have a high density and excellent sharpness, and this thermal transfer method is suitable for recording binary images, such as characters and line drawings. This thermal transfer method is capable of recording multicolor or color images by superposing images of different colors on a recording medium by using a yellow, a magenta, a cyan and a black thermal transfer sheet.

A thermal transfer method of hot-sublimation transfer system is an image recording method that uses a thermal transfer sheet formed by coating a base sheet, such as a plastic film, with a color layer prepared by dispersing or melting a hot-sublimable dye in a binder, such as a resin, and a recording medium formed by coating the surface of a base sheet, such as a paper or plastic sheet, with an image receptive layer, and transfers the hot-sublimable dye contained in the color layer of the thermal transfer sheet to the image receptive layer of the recording medium for image recording by selectively energizing the heating element of a heating device, such as a thermal head, according to image information. Hot-sublimation transfer system is capable of controlling the amount of the dye to be transferred for a single dot by regulating the amount of energy applied to the thermal transfer sheet and hence of forming images of a tone of a wide gradation. Since the dye forms a transparent image, hot-sublimation transfer system has an excellent capability of reproducing a halftone image by superposing a plurality of dye layers. Accordingly, hot-sublimation transfer system is able to record a full-color image of a high image quality by using three thermal transfer sheets, i.e., an yellow, a magenta and a cyan thermal transfer sheet, or four thermal transfer sheets, i.e., an yellow, a magenta, a cyan and a black thermal transfer sheet.

First, an optical disk in a preferred embodiment according to the present invention having a label in which an image is formed by an image transfer method of hot-melt transfer system will be described.

Figure 1:
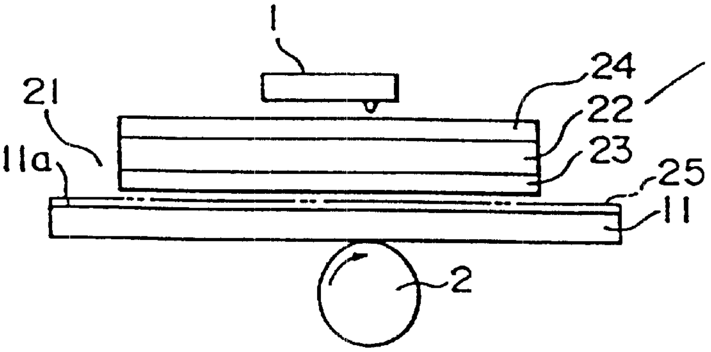
FIGS. 1(A)–(D) are views for explaining a method of hot-melt transfer system of forming an image on an optical disk, in accordance with the present invention.
Figure 1:
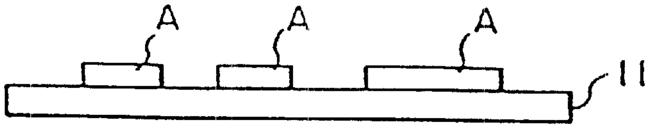
Figure 1:
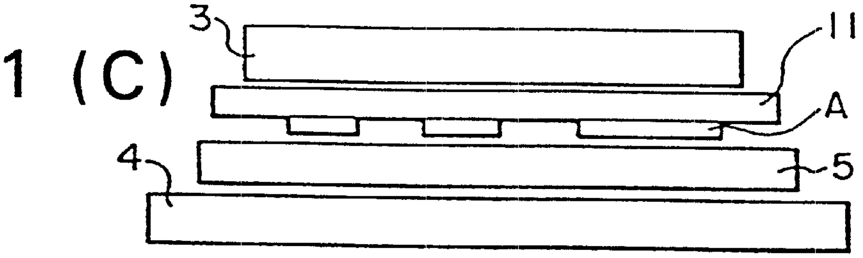
Figure 1:
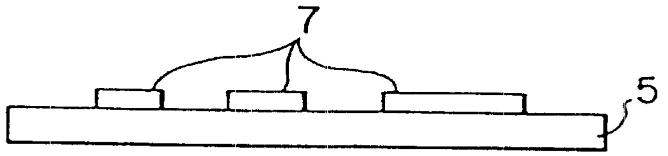

Referring to FIG. 1(A), an intermediate transfer medium 11 and a hot-melt transfer type thermal transfer sheet 21 are laid one on top of the other with the image forming surface 11*a* of the intermediate transfer medium 11 and a hot-melt ink layer (color layer) 23 formed on the thermal transfer sheet 21 in close contact with each other, compressive force is exerted on the combination of the intermediate transfer medium 11 and the thermal transfer sheet 21 by a platen roller 2 and the heating elements of a thermal head 1 are energized according to image data as the combination of the intermediate transfer medium 11 and the thermal transfer sheet 21 passes between the thermal head 1 and the platen roller 2. Consequently, a hot-melt coloring matter contained in the hot-melt ink layer 23 is transferred to the image forming surface 11*a* of the intermediate transfer medium 11 to form an image A as shown in FIG. 1(B). The thermal transfer sheet 21 in this example comprises a base sheet 22, the hot-melt ink layer formed on one of the surfaces of the base sheet 22, and a back layer 24 formed on the other surface of the base sheet 22.

Then, the intermediate transfer medium 11 carrying the image A is laid on an optical disk 5, the combination of the intermediate transfer medium 11 and the optical disk 5 is placed between a hot-stamper 3 and a platen 4 (FIG. 1(C)), and then compressive force is exerted on and heat is applied to the combination of the intermediate transfer medium 11 and the optical disk 5 by the cooperative action of the hot-stamper 3 and the platen 4 to transfer the image A to the optical disk 5 to form a label 7 (FIG. 1(D)). Since the picture of the label 7 of the optical disk 5 is a mirror image of the image A formed on the image forming surface 11*a* of the intermediate transfer medium 11, the image A needs to be a mirror image of patterns, characters, symbols and such to be formed on the optical disk 5. The intermediate transfer medium 11 may be a sheet similar to the base sheet 22 of a thermal transfer sheet 21, which will be described later, and having a thickness, preferably, in the range of 1 to 100 $\mu$m.

When necessary, a recording layer 25 may be formed on the image forming layer 11*a* of the intermediate transfer medium 11 to enhance the transferability of the hot-melt ink layer (color layer) 23 from the thermal transfer sheet 12 to the intermediate transfer medium 11 or the transferability of the image A from the intermediate transfer medium 11 to the optical disk 5. Particularly preferable materials for forming the recording layer 25 are a polyolefin resin, such as polypropylene, a vinyl resin, such has a polyvinyl chloride resin, polyvinylidene resin, a polystyrene resin, a polyvinyl acetate resin, a polyacrylic ester resin or a copolymer of vinyl chloride and vinyl acetate, a polyester resin, such as a polyethylene terephthalate resin or a polybutylene terephthalate resin, a polyamide resin, a copolymer of an olefin, such as ethylene or propylene, and a vinyl monomer, an ionomer resin and a cellulose derivative. The most preferable ones among those materials are a vinyl resin and a polyester resin. The thickness of the recording layer 25 is in the range of about 0.5 to abut 100 $\mu$m.

The base sheet 22 of the hot-melt transfer type thermal transfer sheet 21 may be the same as the base sheet of a conventional thermal transfer sheet. Preferable sheets as the base sheet 22 are thin paper sheets, such as glassine paper sheets, condenser paper sheets and paraffin paper sheets, oriented or nonoriented films of heat-resistant polyesters, such as polyethylene terephthalate, polyethylene naphthalate, polybutylene terephthalate, polyphenylene sulfite, polyether ketone and polyether sulfone, polypropylene, polycarbonate, cellulose acetate, derivatives of polystyrene, polyamide, polyimide, polymethylpentene and ionomer, and composite films of those materials. The thickness of the base sheet 22 is dependent on the properties of the material and is determined so that the base sheet 22 has appropriate properties including strength and heat resistance. Ordinarily, the thickness of the base sheet 22 is in the range of about 1 to about 100 $\mu$m.

The hot-melt ink layer (color layer) 23 of the thermal transfer sheet 21 is formed of a mixture of a coloring matter, i.e., a pigment or a dye, and a wax or a thermoplastic resin.

The back layer 24 of the thermal transfer sheet 21 is formed on the back surface of the base sheet 22 to prevent the fusion of the base sheet 22 by the thermal head (heating device) 1 and the adhesion of the fused base sheet 22 to the thermal head 1 and to ensure the smooth travel of the thermal transfer sheet 21. Preferable materials for forming the back layer 24 are natural resins and synthetic resins including, for example, cellulose resins, such as ethyl cellulose, hydroxyethyl cellulose, hydroxypropyl cellulose, methyl cellulose, cellulose acetate, cellulose acetate butyrate and nitrocellulose, vinyl resins, such as polyvinyl alcohol, polyvinyl acetate, polyvinyl butyral, polyvinyl acetal and polyvinyl pyrrolidone, acrylic resins, such as polymethyl methacrylate resins, polyacrylic ethyl resins, polyacrylamide resins and styrene-acrylonitrile copolymers, polyamide resins, polyurethane resins, and silicone- or fluorine-denatured urethane resins, and mixtures of those materials. To give the back layer 24 an enhanced heat resistance, it is preferable to use a resin having reactive hydroxyl groups and a crosslinking agent, such as polyisocyanate, in combination to form the back layer of a crosslinked resin.

The material forming the back layer 24 may contain a solid or liquid lubricant, such as a mold lubricant, to reduce the friction between the thermal head 1 and the back layer 24 and to enhance the heat resistance of the back layer 24. Suitable lubricants are, for example, waxes, such as a polyethylene wax and a paraffin wax, higher aliphatic alcohols, organopolysiloxane, anionic surface-active agents, cationic surface-active agents, amphorteric surface-active agents, nonionic surface-active agents, fluorine surface-active agents, organic carboxylic acids, derivatives of organic carboxylic acids, fluororesins, silicone resins, and fine particles of inorganic compounds, such as talc and silica. The preferable lubricant content of the material forming the back layer 24 is in the range of 5 to 50 wt. %, preferably, about 10 to about 30 wt. %.

An optical disk in a preferred embodiment according to the present invention having a label in which an image is formed by an image transfer method of hot-sublimation transfer system will be described.

Figure 2:
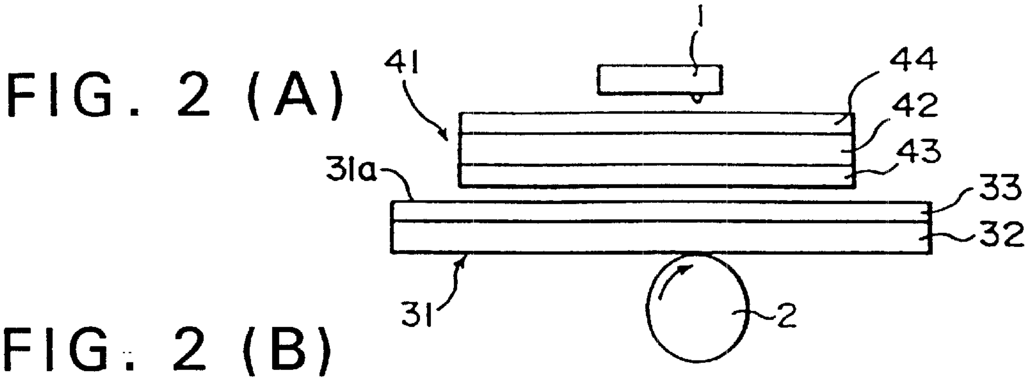
FIGS. 2(A)–(D) are views for explaining a method of hot-sublimation transfer system of forming an image on an optical disk, in accordance with the present invention.
Figure 2:
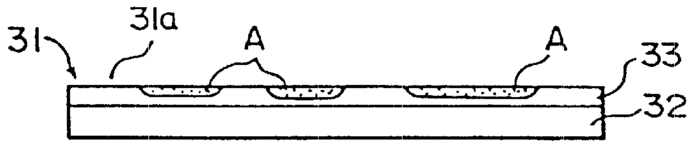
Figure 2:
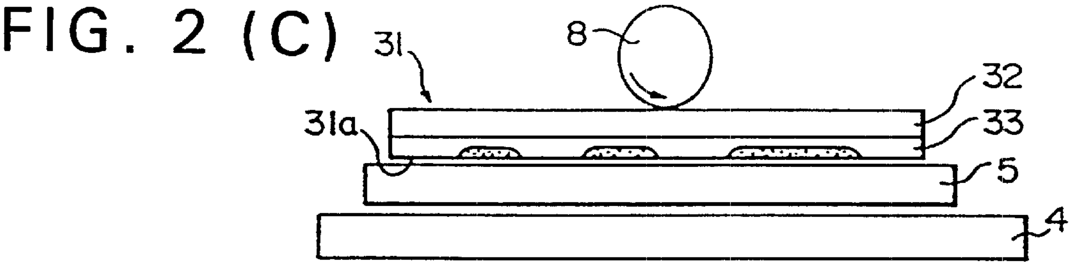
Figure 2:
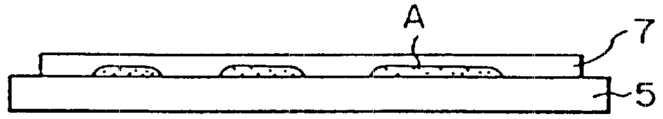

Referring to FIG. 2(A), an intermediate transfer medium 31 and a hot-sublimation transfer type thermal transfer sheet 41 are laid one on top of the other with an image forming surface 31*a* of the intermediate transfer medium 31 and a dye layer (color layer) 43 formed on the hot-sublimation transfer type thermal transfer sheet 41 in close contact with each other, compressive force is exerted on the combination of the intermediate transfer medium 31 and the thermal transfer sheet 41 by a platen roller 2 and the heating elements of a thermal head 1 are energized according to image data as the combination of the intermediate transfer medium 31 and the thermal transfer sheet 41 passes between the thermal head 1 and the platen roller 2. Consequently, a hot-sublimation dye contained in the dye layer 43 is transferred to the image forming surface 31*a* of the intermediate transfer medium 31 to form an image A as shown in FIG. 2(B). The intermediate transfer medium 31 in this embodiment has a base sheet 32 and an image receptive layer 33 formed on the base sheet 32, and the surface of the image receptive layer 33 serves as the image forming surface 31*a*. The thermal transfer sheet 41 comprises a base sheet 42, the dye layer 43 formed on one of the two surfaces of the base sheet 42, and a back layer 44 formed on the other surface of the base sheet 42.

Then, the intermediate transfer medium 31 carrying the image A is laid on an optical disk 5, the combination of the intermediate transfer medium 31 and the optical disk 5 is placed between a heat roller 8 and a platen 4, and then compressive force is exerted on and heat is applied to the combination of the intermediate transfer medium 31 and the optical disk 5 by the cooperative action of the heat roller 8 and the platen 4 as shown in FIG. 2(C) to transfer the image receptive layer 33 carrying the image A to the optical disk 5 by thermocompression bonding to complete the optical disk provided with a label 7 as shown in FIG. 2(D). Since the picture of the label 7 of the optical disk 5 is a mirror image of the image A formed on the image forming surface 31*a* of the intermediate transfer medium 31, the image A needs to be a mirror image of patterns, characters, symbols and such to be formed on the optical disk 5.

The image receptive layer 33 of the intermediate transfer medium 31 is formed so as to be peeled off the base sheet 32 and provides the image forming surface 31*a*. The intermediate transfer medium 31 may be provided on its back surface of the base sheet 32 opposite the image forming surface 31*a,* i.e., the surface opposite the surface on which the image receptive layer 33 is formed, with a back layer to enhance the heat resistance of the intermediate transfer medium 31 and to facilitate the transportation of the intermediate transfer medium 31 for image transfer operation. A separating layer may be formed between the base sheet 32 and the image receptive layer 33 to adjust the peel strength of the image receptive layer 33 to a moderate value. An image protecting layer may be formed between the base sheet 32 and the image receptive layer 33 to protect the image receptive layer 33 to be transferred together with the image A to the optical disk 5 from damage. An intermediate transfer medium 31 shown in FIG. 3 is provided with a back layer 34, a separating layer 35 and an image protecting layer 36 in addition to the component layers of the intermediate transfer medium 31 of FIG. 2(A). The image protecting layer 36 of this intermediate transfer medium 31 is transferred together with the image receptive layer 33 to the optical disk 5 and enhances the weather resistance, the chemical resistance and the fingerprint removability of the label 7.

The base sheet 32 of the intermediate transfer medium 31 may be a sheet like the base sheet 22 of the aforesaid thermal transfer sheet 21, and there is no particular restriction on the base sheet 32. The thickness of the base sheet 32 is dependent on the properties of the material and is determined so that the base sheet 32 has appropriate properties including strength and heat resistance. Ordinarily, the thickness of the base sheet 32 is in the range of about 1 to about 100 $\mu$m.

The image receptive layer 33 contains at least a binder resin. Additive agents including a lubricant may be added to the image receptive layer 33 when necessary. It is preferable to form the image receptive layer 33 of a binder resin easy to dye with a sublimable dye. Preferable binder resins for forming the image receptive layer 33 are polyolefin resins, such as a polypropylene resin, vinyl resins, such as a polyvinyl chloride resin, a polyvinylidene fluoride resin, a polystyrene resin, a polyvinyl acetate resin, a polyacrylic ester resin and a copolymer of vinyl chloride and vinyl acetate, polyamide resins, copolymers of olefin, such as ethylene and propylene, and a vinyl monomer, ionomers, and cellulose derivatives. Among those materials, vinyl resins and polyester resins are particularly preferable.

When the image receptive layer 33 transferred to the optical disk 5 is bonded adhesively to the optical disk 5 by an adhesive layer, which will be described later, the image receptive layer 33 need not necessarily be formed of a thermosensitive adhesive material and hence the image receptive layer 33 may be formed of a resin difficult to soften by heat. Preferably, a lubricant is mixed into the resin forming the image receptive layer 33 to prevent the fusion of the image receptive layer 33 and adhesion of the fused image receptive layer 33 to the thermal transfer sheet 41. Suitable lubricants are silicone oil, phosphatic surface-active agents and fluorine compounds. Among those lubricants, silicone oil is most preferable. The preferable composition of the resin forming the image receptive layer 33 is 0.2 to 30 parts by weight lubricant and 100 parts by weight binder resin. The image receptive layer 33 can be formed by spreading an ink prepared by dissolving or dispersing a mixture of the resin and necessary additive agents including a lubricant in a solvent, such as water or an organic solvent over the surface of the base sheet 32 by an ordinary coating process, such as a gravure printing process, a screen printing process, a reverse roll coating process using a gravure printing plate or the like. Desirably, the thickness of the image receptive layer 33 as dried is in the range of 1 to 10 μm. A process of forming the back layer 34 of the intermediate transfer medium 31 is the same as that of forming the back layer 24 of the thermal transfer sheet 21 and hence the description thereof will be omitted.

The material forming the separating layer 35 contains a binder resin and a lubricant. Suitable binder resins are thermoplastic resins, such as acrylic resins including polymethyl methacrylate resins, polyethyl methacrylate resins and polybutyl acrylate resins, vinyl resins including polyvinyl acetate resins, copolymers of vinyl chloride and vinyl acetate, polyvinyl alcohol resins and polyvinyl butyral resins, and cellulose derivatives including ethyl cellulose, nitrocellulose and cellulose acetate; and thermosetting resins including unsaturated polyester resins, polyester resins, polyurethane resins and aminoalkyd resins. Suitable lubricants are waxes, silicone waxes, silicone resins, melamine resins, fluororesins, talc, fine silica powder, surface-active agents and metallic soaps. The separating layer 35 is formed by a method similar to that of forming the image receptive layer 33. Preferably, the thickness of the separating layer 35 is in the range of 0.1 to 5 μm.

The material forming the image protecting layer 36 contains at least a binder resin. The composition of the resin for forming the image protecting layer 36 is selectively determined so that the image protective layer 36 is properly separable from the base sheet 32, and has desired physical properties as a protective layer for protecting the surface of the image receptive layer 33 after being transferred together with the image receptive layer 33 to the optical disk 5. Generally, the image protecting layer 36 is formed of any one of thermoplastic resins, such as cellulose derivatives including ethyl cellulose, nitrocellulose and cellulose acetate, acrylic resins including polymethyl methacrylate resins, polyethyl methacrylate resins and polybutyl acrylate resins, and vinyl polymers including polyvinyl chloride resins, copolymers of vinyl chloride and vinyl acetate and polyvinyl butyral resins; and thermosetting resins, such as unsaturated polyester resins, polyurethane resins and aminoalkyd resins. When the label 7 formed by transferring the image receptive layer 33 to the optical disk 5 needs to have abrasion resistance, chemical resistance and antifouling property, the image protecting layer 36 may be formed of a radiation-setting resin. The resin for forming the image protecting layer 36 may contain a lubricant for enhancing the abrasion resistance of the label 7, a surface-active agent for preventing fouling, an ultraviolet absorbing agent for enhancing weathering resistance and an oxidation inhibitor. The image protecting layer 36 can be formed by a method similar to that of forming the image receptive layer 33. Preferably, the thickness of the image protecting layer 36 is in the range of 0.1 to 10 μm.

The base sheet 42 of the hot-sublimation transfer type thermal transfer sheet 41 may be the same as the base sheet 22 of the hot-melt transfer type thermal transfer sheet 21. There is no particular restriction on the base sheet 42 of the hot-sublimation transfer type thermal transfer sheet 41. The dye layer 43 consists of a sublimable dye and a binder resin. The sublimable dye is caused to sublimate and migrate by heat to form an image. There is no particular restriction on the type of the sublimable dye; the sublimable dye may be any one of dyes employed in forming conventional thermal transfer sheets. Preferable resins as the binder resin are cellulose resins including ethyl cellulose, hydroxyethyl cellulose, hydroxypropyl cellulose, methyl cellulose, cellulose acetate and cellulose acetate butyrate, vinyl resins including polyvinyl alcohol resins, polyvinyl acetate resins, polyvinyl butyral resins, polyvinyl acetal resins, polyvinyl pyrrolidone resins and polyacrylamide resins, and polyester resins. In view of heat resistance and dye transfer performance, cellulose resins, acetal resins, butyral resins and polyester resins among those resins are particularly preferable. When necessary, the dye layer 43 may contain known additives in addition to the dye and the binder resin.

A process of forming the back layer 44 of the thermal transfer sheet 41 is the same as that of forming the back layer 24 of the thermal transfer sheet 21 and hence the description thereof will be omitted.

Figure 5:
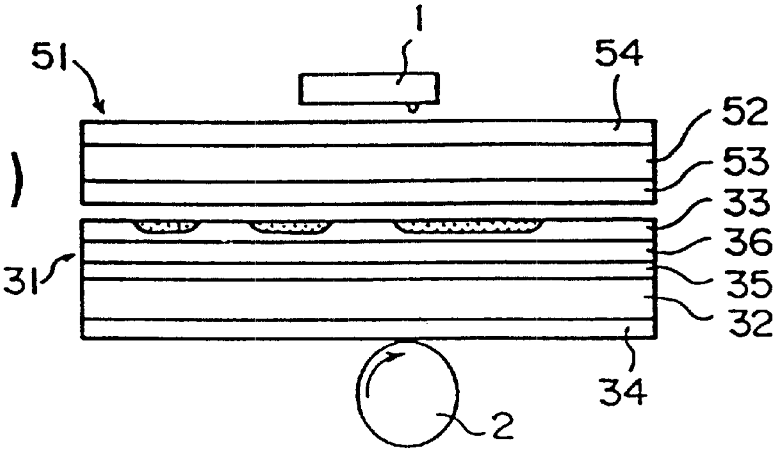
FIGS. 5(A)–(B) are schematic views for explaining a method of forming an image on an optical disk, using an adhesive layer, in accordance with the present invention.
Figure 5:
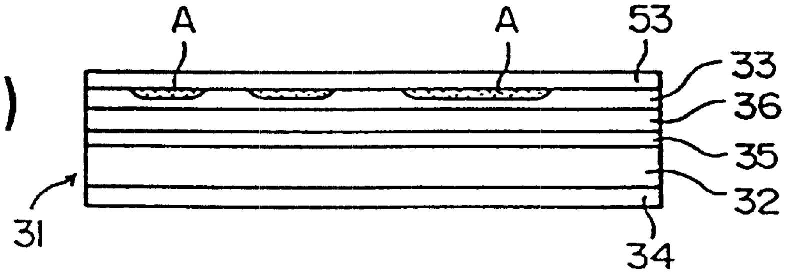
Figure 6:
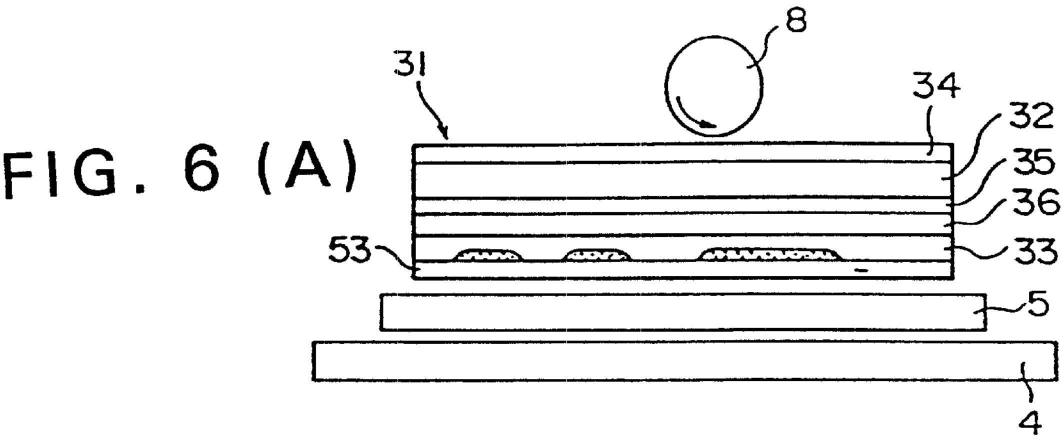
FIGS. 6(A)–(*b*) are schematic views for explaining a method of forming an image on an optical disk, using an adhesive layer, in accordance with the present invention.
Figure 6:
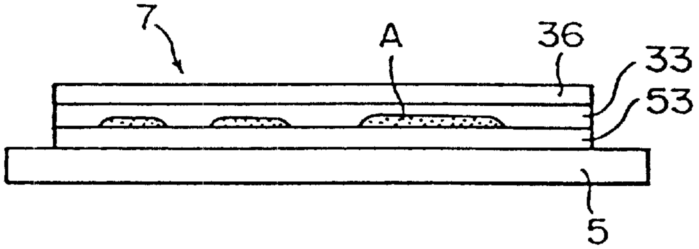

An optical disk in accordance with the present invention provided with a label adhesively bonded thereto by an adhesive layer will be described hereinafter. The aforesaid image forming method of hot-sublimation transfer system transfers the image receptive layer carrying the image to the optical disk to form a label. When the adhesion of the image receptive layer to the optical disk is not sufficiently high, the image receptive layer is bonded to the optical disk by an adhesive layer. FIGS. 4 to 6 illustrates steps of a method of forming an image on an optical disk, using an adhesive layer for bonding an image receptive layer to the optical disk. Referring to FIGS. 4 to 6, an intermediate transfer medium 31 provided with an image receptive layer 33, and a hot-sublimation transfer type thermal transfer sheet 41 provided with a dye layer 43 are laid one on top of the other with the image receptive layer 33 and the dye layer 43 in close contact with each other. Then compressive force is exerted on the combination of the intermediate transfer medium 31 and the thermal transfer sheet 41 by a platen roller 2 and the heating elements of a thermal head 1 are energized according to image data as the combination of the intermediate transfer medium 31 and the thermal transfer sheet 41 passes between the thermal head 1 and the platen roller 2 as shown in FIG. 4(A). Consequently, a hot-sublimable dye contained in the hot-dye layer 43 is transferred to the image receptive layer 33 of the intermediate transfer medium 31 to form an image A in the image receptive layer 33 as shown in FIG. 4(B). In this example, the intermediate transfer medium 31 is provided with a separating layer 35, an image protecting layer 36 and the image receptive layer 33 superposed in that order on one of the surfaces of a base sheet 32, and a back layer 34 formed on the other surface of the base sheet 32. The thermal transfer sheet 41 comprises a base sheet 42, the dye layer 43 formed on one of the surfaces of the base sheet 42, and a back layer 44 formed on the other surface of the base sheet 42.

Then, the intermediate transfer medium 31 and an adhesive layer transfer sheet 51 are laid one on top of the other with the image receptive layer 33 of the intermediate transfer medium 31 carrying the image A and the adhesive layer 53 of the adhesive layer transfer sheet 51 in close contact with each other. Compressive force is applied to the combination of the intermediate transfer medium 31 and the adhesive layer transfer sheet 51 by the thermal head 1 and the platen roller 2 and heat is applied to the combination by the thermal head 1 as the combination passes between the thermal head 1 and the platen roller 2 as shown in FIG. 5(A). Consequently, the adhesive layer 53 of the adhesive layer transfer sheet 51 is transferred onto the image receptive layer 33 of the intermediate transfer medium 31 as shown in FIG. 5(B). In this example, the adhesive layer transfer sheet 51 comprises a base sheet 52, the adhesive layer 53 formed on one of the surfaces of the base sheet 52 and a back layer 54 formed on the other surface of the base sheet 52.

Then, the intermediate transfer medium 31 is put on an optical disk 5 with the adhesive layer 53 in contact with the optical disk 5, and the combination of the intermediate transfer medium 31 and the optical disk 5 is compressed and heat is applied to the same by a platen 4 and a heat roller 8 for thermocompression bonding as shown in FIG. 6(A). Consequently, the image receptive layer 33 and the image protecting layer 36 of the intermediate transfer medium 31 are bonded to the optical disk 5 by the adhesive layer 53 to form a label 7 having the image A on the optical disk 5 as shown in FIG. 6(B). Since the picture of the label 7 of the optical disk 5 is a mirror image of the image A formed in the image receptive layer 33 of the intermediate transfer medium 31, the image A needs to be a mirror image of patterns, characters, symbols and such to be formed on the optical disk 5.

Although the adhesive layer 53 formed on the adhesive layer transfer sheet 51 is transferred onto the image receptive layer 33 of the intermediate transfer medium 31 in this embodiment, an adhesive layer formed on an adhesive layer transfer sheet may be transferred to the surface of the optical disk 5 on which the label 7 is to be formed. As shown in FIG. 7(A), an adhesive layer transfer sheet 51 is put on the optical disk 5 with its adhesive layer 53 in contact with the surface of the optical disk 5, and the adhesive layer 53 and a white layer 55 are transferred and bonded to the optical disk 5 by thermocompression bonding by the platen 4 and the heat roller 8 (FIG. 7(B)). In this example, the adhesive layer transfer sheet 51 is provided with the white layer 55 and the adhesive layer 53 formed in that order on one of the surfaces of a base sheet 52, and a back layer 54 formed on the other surface of the base sheet 52.

Figure 8:
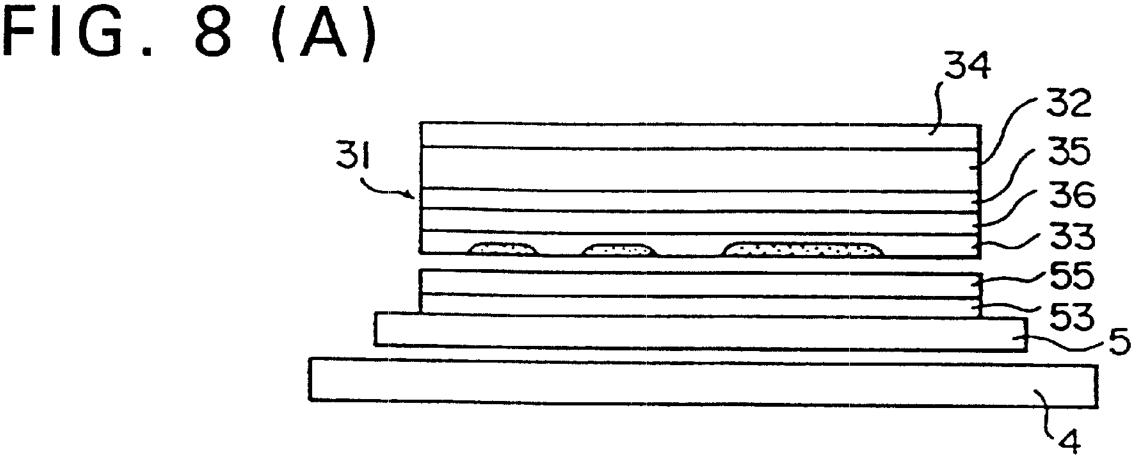
FIGS. 8(A)–(B) are schematic views for explaining a method forming an image on an optical disk, using an adhesive layer, in accordance with the present invention.
Figure 8:
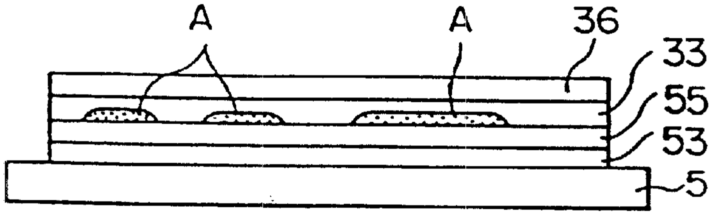

Then, the intermediate transfer medium 31 and the optical disk 5 are laid one on top of the other with the image receptive layer 33 carrying the image A and the white layer 55 bonded to the optical disk 5 in close contact with each other, and compressive force is exerted on and heat is applied to the combination of the intermediate transfer medium 31 and the optical disk 5 for thermocompression bonding by the platen 4 and the heat roller 8 as shown in FIG. 8(A). Consequently, the image receptive layer 33 and the image protecting layer of the intermediate transfer medium 31 are bonded through the white layer 55 to the optical disk 5 by the adhesive layer 53 to form a label 7 in which the image A is formed on the optical disk 5 to complete the optical disk 5 of the present invention provided with the label 7 as shown in FIG. 8(B). The adhesive layer 53 may be transferred from the adhesive layer transfer sheet 51 to either the intermediate transfer medium 31 or the optical disk 5, or to both the intermediate transfer medium 31 and the optical disk 5.

The construction of the adhesive layer transfer sheet 51 will be described in detail. As shown in FIG. 9, the adhesive layer transfer sheet 51 comprises a base sheet 52 and the adhesive layer 53 formed at least in a portion of one surface of the base sheet 52 so as to be separable from the base sheet 52. There is no particular restriction on the base sheet 52 of the adhesive layer transfer sheet 51; the base sheet 52 of the adhesive layer transfer sheet 51 may be the same as the base sheet 22 of the aforesaid thermal transfer sheet 21. The thickness of the base sheet 52 is dependent on the material forming the base sheet 52 and is selectively determined so that the base sheet 52 has appropriate properties including strength and heat resistance. Ordinarily, the thickness of the base sheet 52 is in the range of about 1 to about 100 μm.

Preferably, the adhesive layer 53 of the adhesive layer transfer sheet 51 is formed of a thermosensitive adhesive material, such as a thermoplastic synthetic resin, a natural resin, rubber or a wax. More concretely, materials suitable for forming the adhesive layer 53 are cellulose derivatives including ethyl cellulose and cellulose acetate propionate, styrene resins including polystyrene resins and α-methyl styrene resins, acrylic resins including polyethyl methacrylate resins, polymethyl methacrylate resins and polyacrylic ethyl resins, vinyl resins including polyvinyl chloride resins, polyvinyl acetate resins, copolymers of vinyl chloride and vinyl acetate, and polyvinyl butyral resins, and natural and synthetic resins including polyester resins, polyamide resins, epoxy resins, polyurethane resins, ionomers and copolymers of ethylene and acrylic ester, and tackifiers including rosin, rosin-denatured maleic resins, ester gum, polyisobutylene rubber, butyl rubber, styrene-butadiene rubber, butadiene-acrylonitrile rubber, polyamide resins and chlorinated polyolefin resins. The adhesive layer 53 may be formed of one of those materials or of a composite of some of those materials. The thickness of the adhesive layer 53 is determined taking into consideration the adhesion between the image receptive layer and the optical disk, and facility in handling. Ordinarily, the thickness of the adhesive layer is in the range of about 0.1 to about 200 μm.

The present invention may employ an adhesive layer transfer sheet 51 comprising a base sheet 52, an adhesive layer 53 formed on one of the surfaces of the base sheet 52 and a back layer 54 formed on the other surface of the base sheet 52 as shown in FIG. 5(A). A method of forming the back sheet 54 is the same as that of forming the back layer 24 of the thermal transfer sheet 21 and hence the description thereof will be omitted.

Usually, the surfaces of a compact disk among optical disks are coated with an evaporated metal film, such as an aluminum film, and have a silvery or golden sheen. Therefore, it is effective to form an image on a white background on an optical disk, such as a compact disk to make the image look clearer. A white adhesive layer may be used instead of the aforesaid adhesive layer 53 to secure such an effect for making the image look more clear. A white adhesive layer may be formed of a thermosensitive adhesive material containing an inorganic filler, such as titanium oxide, calcium carbonate, magnesium sulfate, silicon dioxide or such, or an organic filler, such as a polystyrene resin, a polyamide resin, an acrylic resin, a fluororesin or such.

Figure 11:
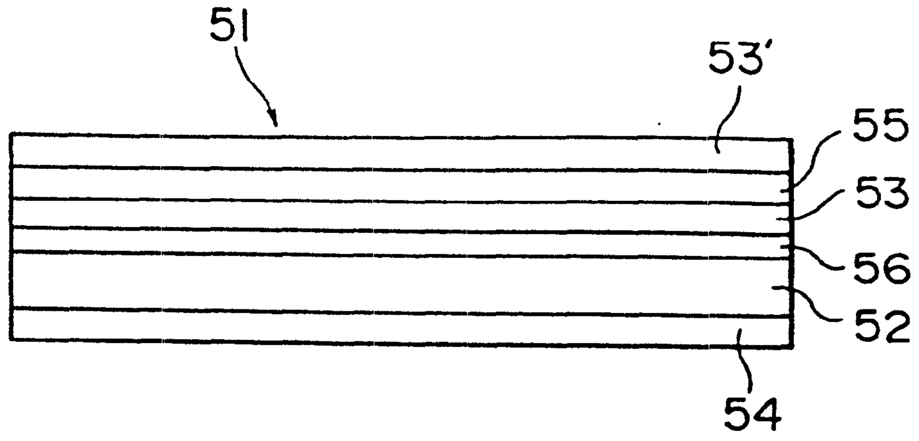
FIG. 11 is a view of an adhesive layer transfer sheet in accordance with the present invention.

When necessary, a white layer may be formed on one surface of the adhesive layer transfer sheet in addition to the adhesive layer. When it is desired to transfer an adhesive layer and a white layer to the image receptive layer 33 of the intermediate transfer medium 31, an adhesive layer transfer sheet 51 as shown in FIG. 10(A) is used. The adhesive layer transfer sheet 51 comprises a base sheet 52, an adhesive layer 53 formed on a base sheet 52, and a white layer 55 formed on the adhesive layer 53. When necessary, a separating layer 56 may be formed between the base sheet 52 and the adhesive layer 53 as shown in FIG. 10(B) to adjust the peel strength of the adhesive layer 53 to a moderate value. It is also possible to use an adhesive layer transfer sheet 51 as shown in FIG. 11 additionally provided, in addition with component layers corresponding to those of the adhesive layer transfer sheet 51 of FIG. 10(B), a second adhesive layer (additional adhesive layer) 53' formed on a white layer 55 formed of a binder resin containing an inorganic filler or an organic filler. The binder resin forming the white layer 55 may be any one of the aforesaid binder resins suitable for forming the image receptive layer of the intermediate transfer medium, and the aforesaid resins suitable for forming the adhesive layer. The material forming the second adhesive layer 53' may be the same as that forming the adhesive layer 53. The second adhesive layer 53' is intended to enhance the adhesion between the white layer 55 and the image receptive layer of the intermediate transfer medium. The separating layer 56 is intended to adjust the peel strength of the adhesive layer 53, i.e., a force necessary for peeling the adhesive layer 53 off the base sheet 52, to a moderate value. The separating layer 56 can be formed by the method of forming the separating layer of the intermediate transfer medium. When the adhesive layer 53 of the adhesive layer transfer sheet 51 as shown in any one of FIGS. 10(A), 10(B) and 11 is transferred onto the image receptive layer 33 of the intermediate transfer medium 31, and then the image receptive layer 33 is transferred to the optical disk 5, the image A is formed on the white layer 55.

Figure 7:
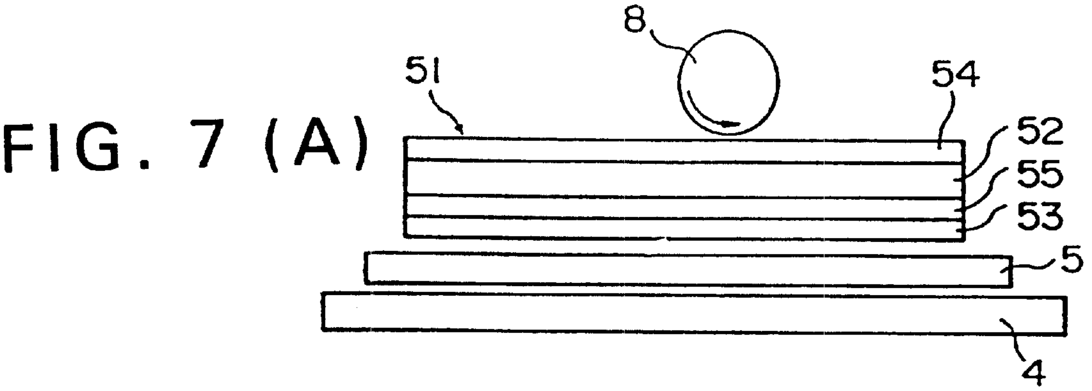
FIGS.7(A)–(B) are schematic views for explaining a method of forming an image on an optical disk, using an adhesive layer, in accordance with the present invention.
Figure 7:
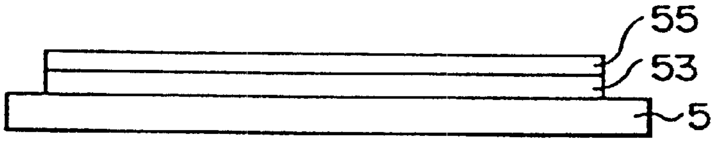
Figure 12:
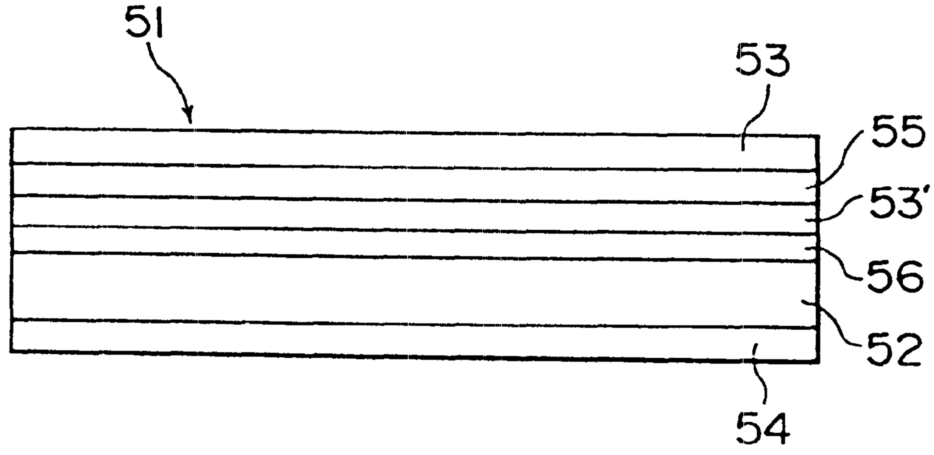
FIG. 12 is a view of an adhesive layer transfer sheet in accordance with the present invention.

When it is desired to transfer the adhesive layer 53 of the adhesive layer transfer sheet 51 to the optical disk 5 and to form the image A on the white layer, it is possible to use an adhesive layer transfer sheet like the adhesive layer transfer sheet shown in FIG. 7 provided with the white layer 55 and the adhesive layer 53 formed in that order on the base sheet 52, or an adhesive layer transfer sheet like an adhesive layer transfer sheet 51 shown in FIG. 12 provided with a separating layer 56, a second adhesive layer 53', a white layer 55 and an adhesive layer 53 formed in that order on a base sheet 52.

Figure 13:
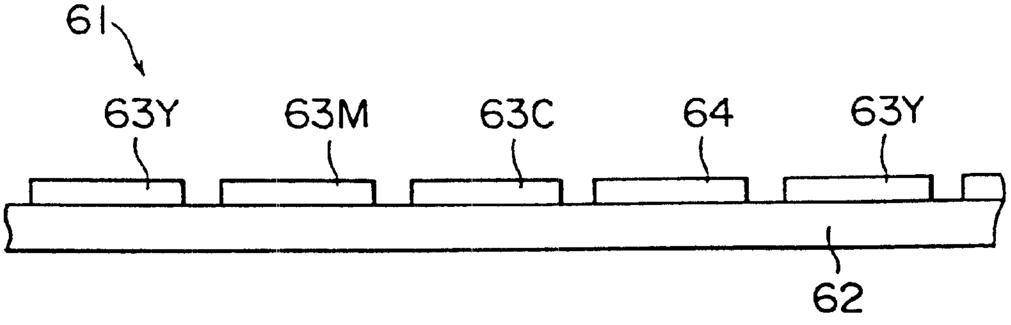
FIG. 13 is a view of an adhesive layer transfer sheet in accordance with the present invention.

Although each of the foregoing adhesive layer transfer sheets is provided with the adhesive layer over the entire area of one of the surfaces of the base sheet, an adhesive layer transfer sheet in accordance with the present invention is not limited thereto. For example, as shown in FIG. 13 when forming an adhesive layer on an intermediate transfer medium carrying an image, an adhesive layer transfer sheet (integral adhesive thermal transfer sheet) 61 provided with dye layers 63Y, 63M and 63C and an adhesive layer 64 are sequentially formed in that order in a planar arrangement on the surface of a base sheet 62. When this integral adhesive thermal transfer sheet 61 is used, an image can be formed on and the adhesive layer can be transferred to the image receptive layer of an intermediate transfer medium continuously by transferring the adhesive layer to the image receptive layer by the agency of an image forming thermal head subsequently to the transference of the dye layers to the image receptive layer.

Figure 14:
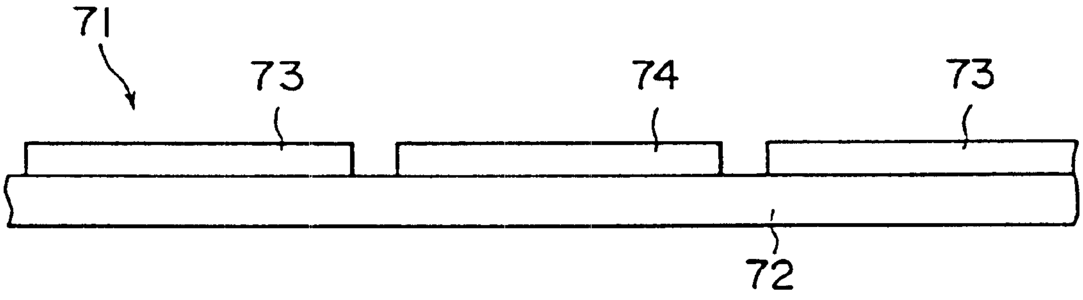
FIG. 14 is a view of an adhesive layer transfer sheet.

An adhesive layer can be formed on an optical disk by using an adhesive layer transfer sheet (integral adhesive intermediate transfer medium) 71 provided with image receptive layers 73 and adhesive layers 74 alternately formed in a planar arrangement on the surface of a base sheet 72 as shown in FIG. 14. When the integral adhesive intermediate transfer medium 71 is employed, first the adhesive layers 71 are transferred to the image forming surface of an optical disk by a transfer device, and then the image receptive layers 73 carrying an image are transferred together with the image to the optical disk by the same transfer device.

Although the invention has been described as applied to image forming methods of hot-melt transfer system and hot-sublimation transfer system, the present invention is not limited thereto. For example, in carrying out an image forming method of hot-sublimation transfer system, both a hot-melt transfer type thermal transfer sheet and a hot-sublimation transfer type thermal transfer sheet may be used in combination.

The optical disks referred to in the foregoing embodiments may be compact disks, laser disks, magnetooptic disks or phase change optical disks. A principal material for forming compact disks is a polycarbonate resin and a principal material for forming magnetooptic disk is glass. There is no restriction on the optical disk of the present invention. The image forming method of the present invention is capable of forming a clear, highly sharp image including pictures, characters and/or symbols, on one of the surfaces or both the surfaces of an optical disk regardless of the material forming the optical disk.

As is apparent from the foregoing description, according to the present invention, a clear, highly sharp image can be formed on the intermediate transfer medium or on the separable image receptive layer of the intermediate transfer medium on the basis of image data produced by using a computer or the like, and the image or the image receptive layer carrying the image is transferred intactly to an optical disk to form a label. Accordingly, the present invention does not need work for preparing a printing plate, changing the printing plate and cleaning the printing plate, which needs to be repeated frequently when forming an image on optical disks by a conventional printing process, and is capable of efficiently forming an image on optical disks even if the optical disks are of a small lot, of producing patterns in an on-demand mode, which is impossible by a method using a printing process, and of forming a label including a clear, highly sharp image of characters and such in a high image quality which could not have been achieved by the conventional method using a printing process. Thus, the present invention provides an optical disk of an excellent design.

Second Embodiment

An image forming method in a second embodiment according to the present invention comprises steps of combining an intermediate transfer medium having an image receptive layer, and a thermal transfer sheet having a color layer with the image receptive layer and the color layer in close contact with each other, compressing the combination of the intermediate transfer medium and the thermal transfer sheet between a thermal head and a platen roller, selectively energizing the heating elements of the thermal head according to image data to form an image on the image receptive layer by transferring a thermomigratory coloring matter contained in the color layer from the color layer to the image receptive layer, puts an optical disk on the image receptive layer of the intermediate transfer medium, carrying the image, and heating the intermediate transfer medium by a heating device to transfer the image receptive layer carrying the image to the optical disk to form the image on the optical disk.

The image may be transferred from the color layer of the thermal transfer sheet to the the image receptive layer of the intermediate transfer medium by an image forming method of either hot-melt transfer system or hot-sublimation transfer system.

An image forming method of hot-melt transfer system is an image recording method that uses a thermal transfer sheet formed by coating a base sheet, such as a plastic film with a layer of a hot-melt ink prepared by dispersing a coloring matter, such as a pigment, in a binder, such as hot-melt wax or resin, and transfers the coloring matter together with the binder to a recording medium, such as a paper sheet or a plastic sheet by selectively energizing the heating elements of a heating device, such as a thermal head, according to image information. Images recorded by the image forming method of hot-melt transfer system have a high density and excellent sharpness, and the image forming method of hot-melt transfer system is suitable for recording binary images, such as characters and line drawings. The image forming method of hot-melt transfer system is capable of recording multicolor or color images by superposing images of different colors on a recording medium by using an yellow, a magenta, a cyan and a black thermal transfer sheet.

A thermal transfer method of hot-sublimation transfer system is an image recording method that uses a thermal transfer sheet formed by coating a base sheet, such as a plastic film, with a color layer prepared by dispersing or melting a hot-sublimable dye in a binder, such as a resin, and a recording medium formed by coating the surface of a base sheet, such as a paper or plastic sheet, with an image receptive layer, and transfers the hot-sublimable dye contained in the color layer of the thermal transfer sheet to the image receptive layer of the recording medium for image recording by selectively energizing the heating element of a heating device, such as a thermal head, according to image information. Hot-sublimation transfer system is capable of controlling the amount of the dye to be transferred for a single dot by regulating the amount of energy applied to the thermal transfer sheet and hence of forming images of a tone of a wide gradation. Since the dye forms a transparent image, hot-sublimation transfer system has an excellent capability of reproducing a halftone image by superposing a plurality of dye layers. Accordingly, hot-sublimation transfer system is able to record a full-color image of a high image quality by using three thermal transfer sheets, i.e., an yellow, a magenta and a cyan thermal transfer sheet, or four thermal transfer sheets, i.e., an yellow, a magenta, a cyan and a black thermal transfer sheet.

Particularly, the image forming surface of a recording medium on which an image is to be formed by the image forming method of hot-sublimation transfer system must be dyable. An image receptive layer is formed on the image forming surface of a recording paper for image formation by the image forming method of hot-sublimation transfer system when the image forming surface is undyable. Usually an image receptive layer is formed on an image recording medium by an image receptive layer forming method that transfers the image receptive layer separably formed on the base sheet of an image receptive layer transfer sheet to the image recording medium. The condition of the image receptive layer formed on the image recording medium by this image receptive layer forming method, however, is greatly dependent on the surface condition of the image recording medium; that is, this image receptive layer forming method fails to form the image receptive layer in depressed portions on the surface of the image recording medium, the surface roughness of the transferred image receptive layer is dependent on the surface roughness of the image recording medium and an uneven image is liable to be formed on the image receptive layer. Therefore, the present invention, as mentioned above, forms a high-quality image on an image receptive layer formed on the smooth, flat surface of an intermediate transfer medium and transfers the image receptive layer carrying the image to an optical disk, i.e., an image recording medium, whereby the image can be formed in a high image quality on the surface of the optical disk having irregularities and pits. Since an image formed on an optical disk is a mirror image of the image formed on the image receptive layer of the intermediate transfer medium, the image including patterns, characters, symbols and such on the image receptive layer needs to be a mirror image of patterns, characters, symbols and such to be formed on the optical disk.

Figure 15:
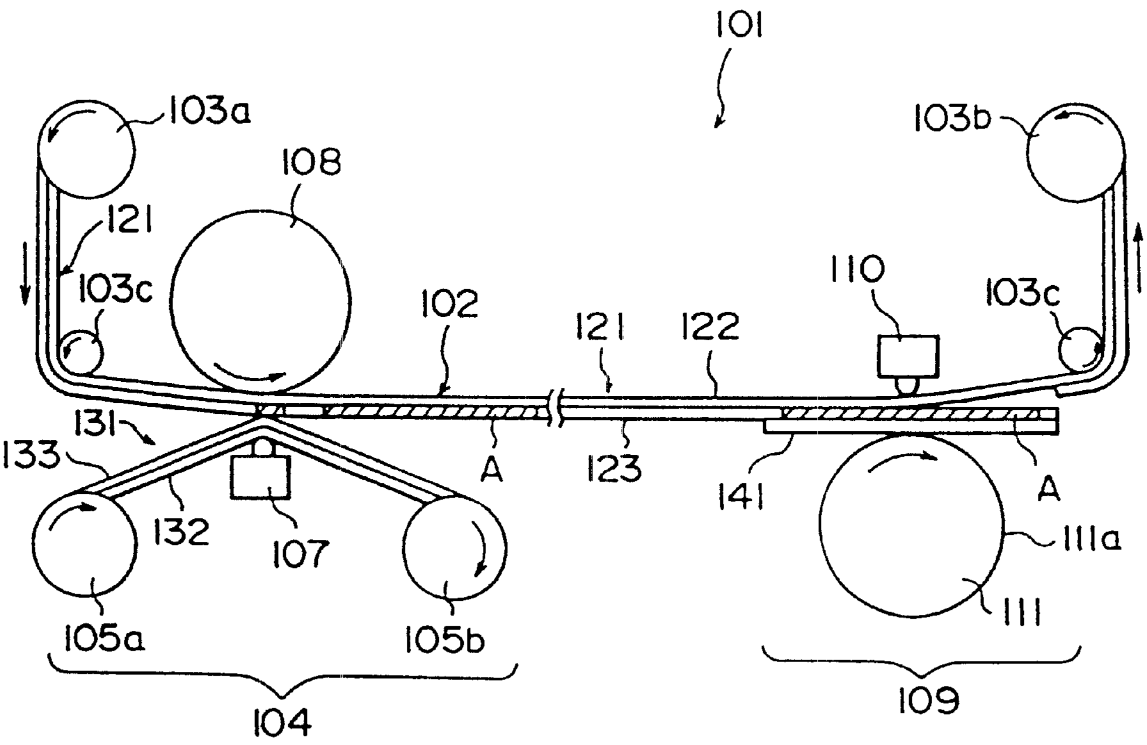
FIG. 15 is a schematic side view of an image forming apparatus in a preferred embodiment according to the present invention for forming an image on an optical disk.

FIG. 15 is a schematic view of an image forming apparatus in a preferred embodiment according to the present invention for carrying out the foregoing image forming method in accordance with the present invention. Referring to FIG. 15, an image forming apparatus 101 comprises a first conveying mechanism 102 for conveying an intermediate transfer medium 121, a second conveying mechanism 104 for conveying a thermal transfer sheet 131, an image forming unit 106 for forming an image A on the intermediate transfer medium 121, including a thermal head 107 and a rolling platen 108, and an image receptive layer transfer unit 109 for transferring the image A from the intermediate transfer medium 121 to an optical disk 141.

The first conveying mechanism 102 comprises an intermediate transfer medium supply roller 103*a* supporting a roll of the intermediate transfer medium 121 consisting of a base sheet 122 and an image receptive layer 123 formed on one surface of the base sheet 122, an intermediate transfer medium take-up roller 103*b*, and guide rollers 103*c* for guiding the intermediate transfer medium 121 along an intermediate transfer medium conveying path. The second conveying mechanism 104 comprises a thermal transfer sheet supply roller 105*a* supporting a roll of thermal transfer sheet 131, and a thermal transfer sheet take-up roller 105*b*.

The thermal head 107 and the rolling platen 108 of the image forming unit 106 are disposed so as to exert compressive force to the intermediate transfer medium 121 and the thermal transfer sheet 131 combined with the image receptive layer 123 and the color layer 133 in close contact with each other. The heating elements of the thermal head 107 are energized according to image data to transfer a thermomigratory coloring matter contained in the color layer 133 to the image receptive layer 123 to form the image A on the image receptive layer 123.

The image receptive layer transfer unit 109 is disposed after the image forming unit 106 with respect to the direction of travel of the intermediate transfer medium 121 on the conveying path. The image receptive layer transfer unit 109 has a thermal head 110, i.e., a heating device, and an optical disk support roller 111, i.e., a rolling platen. An optical disk 141 is fed to the image receptive layer transfer unit 109 so that the optical disk 141 is brought into contact with the image receptive layer 123 of the intermediate transfer medium 121 carrying the image A between the thermal head 110 and the optical disk support roller 111. The image receptive layer 123 carrying the image A is transferred to the optical disk 141 by the cooperative action of the thermal head 110 and the optical disk support roller 111. Since an image formed on the optical disk 141 is a mirror image of the image A formed on the image receptive layer 123 of the intermediate transfer medium 121, the image A including patterns, characters, symbols and such on the image receptive layer 123 needs to be a mirror image of patterns, characters, symbols and such to be formed on the optical disk 141.

Figure 16:
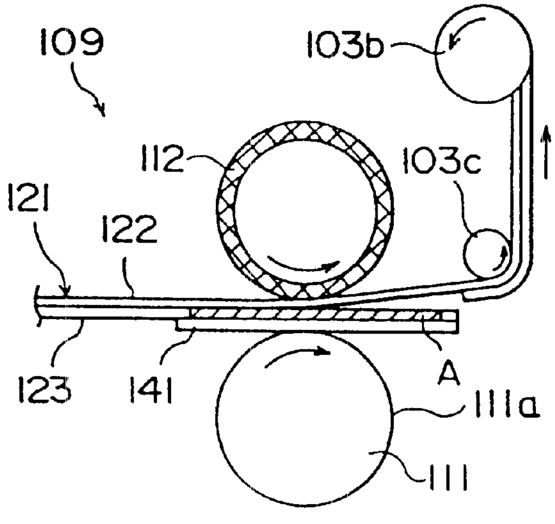
FIG. 16 is a schematic fragmentary side view of an image forming apparatus in another preferred embodiment according to the present invention for forming an image on an optical disk.

FIG. 16 is a schematic fragmentary view of an image forming apparatus in a further embodiment according to the present invention. The image forming apparatus shown in FIG. 16 has an image receptive layer transfer unit 109 provided with a heating device different from that of the image receptive layer transfer unit 109 of the image forming apparatus of FIG. 15. The first conveying mechanism for conveying the intermediate transfer medium 121, the second conveying mechanism 104 for conveying the thermal transfer sheet 131, and the image forming unit for forming the image A on the intermediate transfer medium 121, having a thermal head and a platen roller of the image forming apparatus in this embodiment are the same as those of the image forming apparatus shown in FIG. 16, respectively, and hence those are not shown in FIG. 16.

Referring to FIG. 16, the image receptive layer transfer unit 109 of the image forming apparatus is provided with a heat roller 112, i.e., a heating device, and an optical disk support roller 111, i.e., a rolling platen, which are disposed opposite to each other on the opposite sides, respectively, of the intermediate transfer medium 121 and the optical disk 141. The surface temperature of the heat roller 112 is in the range of about 50 to about 200° C. and the surface speed of the same is in the range of about 5 to about 100 mm/sec. An optical disk 141 is fed to the image receptive layer transfer unit 109 so that the optical disk 141 is brought into contact with the image receptive layer 123 of the intermediate transfer medium 121 carrying the image A between the thermal head 110 and the optical disk support roller 111. The image receptive layer 123 carrying the image A is transferred to the optical disk 141 by the cooperative action of the thermal head 110 and the optical disk support roller 111.

Figure 17:
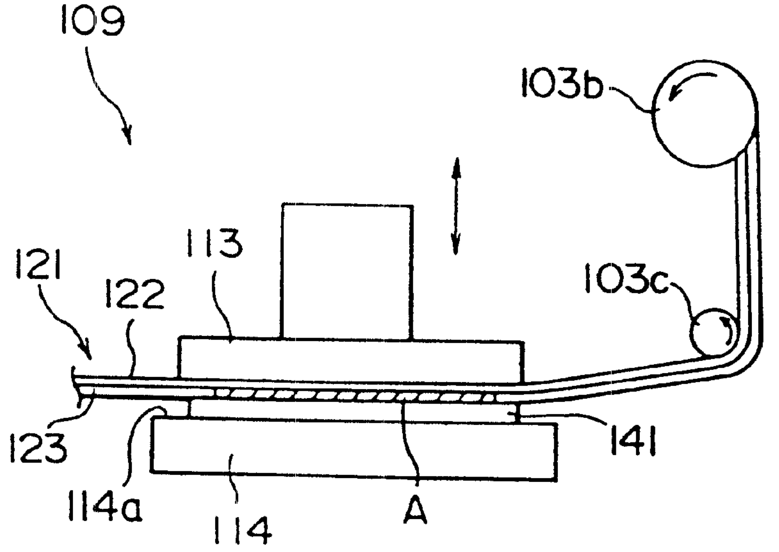
FIG. 17 is a schematic fragmentary side view of an image forming apparatus in a further preferred embodiment according to the present invention for forming an image on an optical disk.

FIG. 17 is a schematic fragmentary view of an image forming apparatus in a further embodiment according to the present invention. The image forming apparatus shown in FIG. 17 has an image receptive layer transfer unit 109 provided with a heating device different from that of the image receptive layer transfer unit 109 of the image forming apparatus of FIG. 15. The first conveying mechanism for conveying the intermediate transfer medium 121, the second conveying mechanism 104 for conveying the thermal transfer sheet 131, and the image forming unit for forming the image A on the intermediate transfer medium 121, having a thermal head and a platen roller of the image forming apparatus in this embodiment are the same as those of the image forming apparatus shown in FIG. 16, respectively, and hence those are not shown in FIG. 17.

Referring to FIG. 17, the image receptive layer transfer unit 109 if the image forming apparatus is provided with a hot stapmer 113, i.e., a heating device, and an optical disk support plate 114, i.e., a flat platen, which are disposed opposite to each other on the opposite sides, respectively, of the intermediate transfer medium 121 and the optical disk 141. The hot stamper 113 can be brought into contact with and separated from the intermediate transfer medium 121. The image receptive layer transfer unit 109 feeds the optical disk 141 so that the optical disk 141 comes into contact with the image receptive layer 123 of the intermediate transfer medium 121 carrying the image A, the hot stamper 113 is moved toward the optical disk support plate 114 upon the arrival of the image receptive layer 123 and the optical disk 141 between the hot stamper 113 and the optical disk support plate 114 to exert pressure on and to apply heat to the intermediate transfer medium 121, so that the image receptive layer 123 carrying the image A is transferred to the optical disk 141. The surface temperature of the hot stamper 113 is in the range of about 50 to about 200° C., the compressive force exerted on the intermediate transfer medium 121 and the optical disk 141 combined with the intermediate transfer medium 121 is in the range of about 0.1 to about 5 kg/cm$^2$, and the preferable pressing duration is in the range of about 0.3 to about 20 sec.

Figure 18:
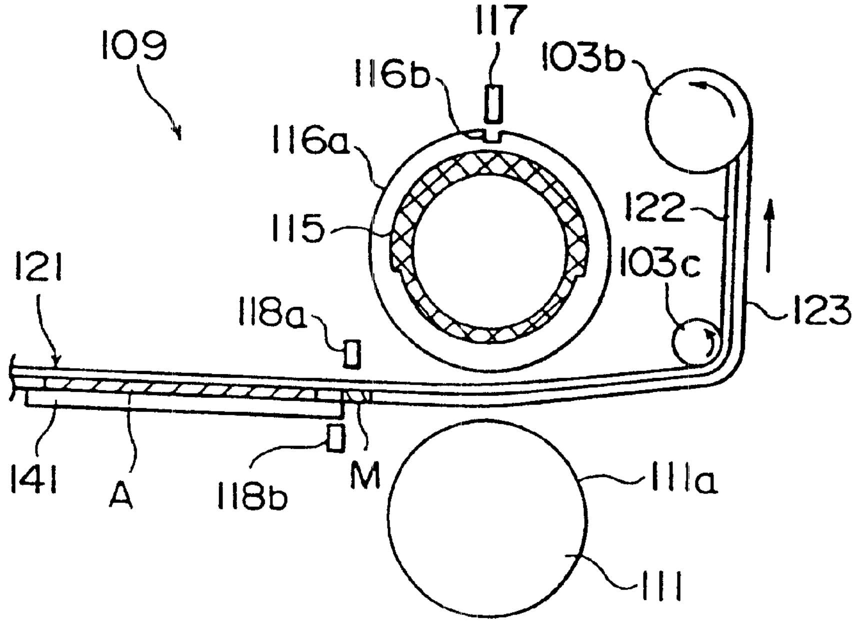
FIG. 18 is a schematic fragmentary side view of an image forming apparatus in a still further preferred embodiment according to the present invention for forming an image on an optical disk.

FIG. 18 is a schematic fragmentary view of an image forming apparatus in a still further embodiment according to the present invention. An image forming apparatus 101 shown in FIG. 18 has an image receptive layer transfer unit 109 provided with a heating device different from that of the image receptive layer transfer unit 109 of the image forming apparatus of FIG. 15. The first conveying mechanism for conveying the intermediate transfer medium 121, the second conveying mechanism 104 for conveying the thermal transfer sheet 131, and the image forming unit for forming the image A on the intermediate transfer medium 121, having a thermal head and a platen roller of the image forming apparatus in this embodiment are the same as those of the image forming apparatus shown in FIG. 16, respectively, and hence those are not shown in FIG. 18.

Figure 19:
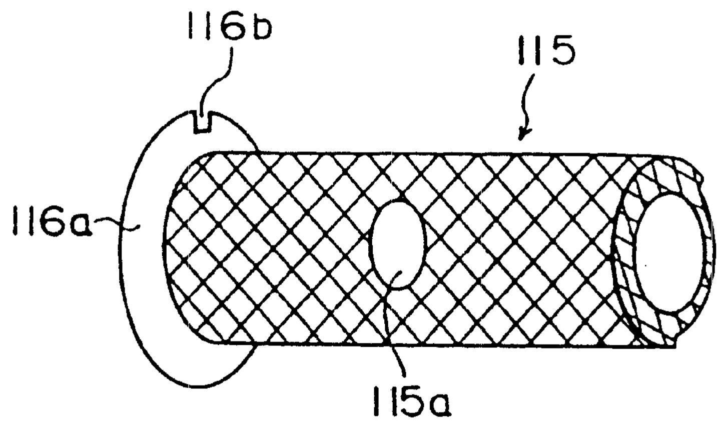
FIG. 19 is a perspective view of a heat roller provided with a pattern on its circumference and included in the image forming apparatus of FIG. 18.

Referring to FIG. 18, the image receptive layer transfer unit 109 of the image forming apparatus is provided with a heat roller 115 having a patterned circumference, i.e., a heating device, and an optical disk support roller 111, which are disposed opposite to each other on the opposite sides, respectively, of the intermediate transfer medium 121 and the optical disk 141. The heat roller 115 can be brought into contact with and separated from the intermediate transfer medium 121. The surface temperature of the heat roller 115 is in the range of about 50 to about 200° C., and the surface speed of the same is in the range of about 5 to 100 mm/sec. Generally, the optical disk has a stepped labeling surface, i.e., a surface opposite a recording surface, and a central opening. The heat roller 115 having a patterned circumference is used to transfer an image receptive layer carrying an image only to flat portions of the labeling surface. As shown in FIG. 19, the patterned circumference of the heat roller 115 has an inoperative region 115*a* that does not contribute to transferring the image receptive layer 109 from the intermediate transfer medium 121 to the optical disk 141. The inoperative region 115*a* has a shape corresponding to the central opening of the optical disk 141 and is formed at a predetermined position. The image forming apparatus is provided with a synchronizing mechanism for synchronizing operations for conveying the intermediate transfer medium 121 carrying an image A, feeding the optical disk 141 and rotating the heat roller 115 to align the pattern of the heat roller 115, the labeling surface of the optical disk 141 and the image A on the intermediate transfer medium 121. As shown in FIG. 19, a positioning disk 116*a* provided with a notch 116*b* in its circumference is attached to one axial end of the heat roller 115. The image receptive layer transfer unit 109 is provided with a position sensor 117 (FIG. 18) for optically detecting the notch 116*b*. A position sensor 118*a* for optically detecting a register mark M formed on the intermediate transfer medium 121 and a position sensor 118*b* for optically detecting the leading edge of the optical disk 141 are disposed at predetermined positions on the receiving side of the image receptive layer transfer unit 109.

Figure 20:
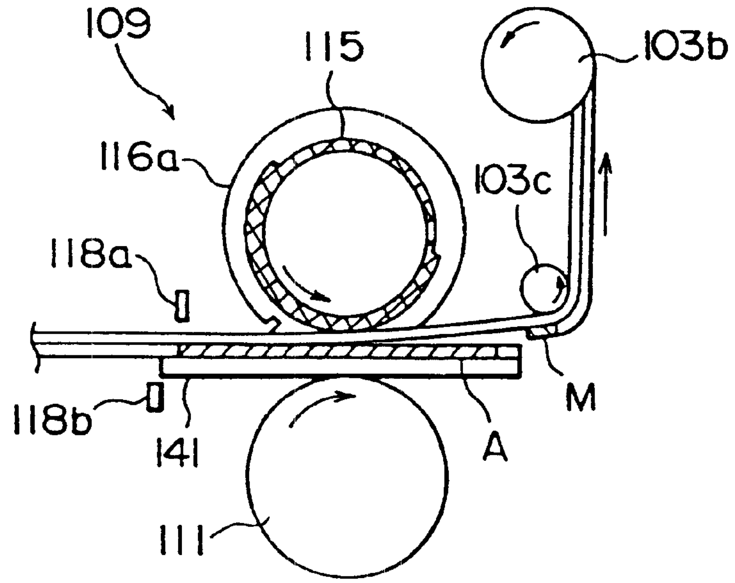
FIG. 20 is a schematic sectional view for explaining an operation of the image forming apparatus of FIG. 18 for transferring an image receptive layer.

In the image forming apparatus provided with the image receptive layer transfer unit 109 shown in FIGS. 18 and 19, the notch 116*a* of the heat roller 115 corresponds with the position sensor 117 when the heat roller 115 is turned to a starting angular position at a predetermined standby position as shown in FIG. 18. Upon the optical detection of the notch 116*b* by the position sensor 117, the heat roller 115 is stopped at the starting angular position. Upon the detection of the register mark M of the intermediate transfer medium 121 and the leading edge of the optical disk 141 by the position sensors 118*a* and 118*b*, the heat roller 115 is moved toward the intermediate transfer medium 121 to a working position and starts rotating as shown in FIG. 20 to transfer the image receptive layer 123 carrying the image A to the optical disk 141. After the image receptive layer 123 has thus been transferred to the optical disk 141 by the action of the heat roller 115 having the patterned circumference, the heat roller 115 is returned from the working position to the standby position and is stopped upon the optical detection of the notch 116*b* by the position sensor 117.

The detection of the arrival of the heat roller 115 at the starting angular position need not necessarily be achieved through the optical detection of the notch 116*b* by the position sensor 117, but may be achieved, for example, through the detection of the angular position of the rotor of a stepping motor for driving the heat roller 115.

The register mark M of the intermediate transfer medium 121 need not necessarily be an optically detectable one, but may be a register mark of any type, such as a magnetic stripe, a mechanically detectable projection or recess or the like, provided that the position of the register mark is detectable. The register mark M may be formed when fabricating the intermediate transfer medium 121 or when forming the image A on the image receptive layer 123 by the image forming unit 106. Although it is easy to detect the arrival of the optical disk 141 at a predetermined position optically, the arrival of the optical disk 141 at the predetermined position may be detected by a switching means disposed so as to be actuated by the optical disk 141.

Although the image forming unit 106 and the image receptive layer transfer unit 109 of each of the foregoing image forming apparatus are included in a processing line, the image forming unit 106 and the image receptive layer transfer unit 109 may be included in separate processing lines, i.e., an image forming line and an image receptive layer transfer line, respectively. In the latter case, the image receptive layer transfer line may comprise any of of the image receptive transfer units 109 shown in FIGS. 15 to 20, and an intermediate transfer means conveying mechanism.

An image forming apparatus in accordance with the present invention may employ a line heater for heating the intermediate transfer medium. Preferably, the surface temperature of the line heater is in the range of about 50 to about 200° C.

The respective working surfaces 111*a* and 114*a* of the optical disk support rollers 111 and the optical disk support plate 114 may be formed of an elastic or shock-absorbing material, such as rubber, to distribute pressure uniformly on the image receptive layer 123 and to ensure satisfactory close contact between the image receptive layer 123 and the optical disk 141 when transferring the image receptive layer to the optical disk by the image receptive layer transfer unit 109. In some cases, portions of the image receptive layer 123 of the intermediate transfer medium 121 not corresponding to the optical disk 141 come into direct contact with the working surface 111*a* of the optical disk support roller 111 or the working surface 114 of the optical disk support plate 114, and those portions of the image receptive layer 123 are transferred to the working surface 111*a* of the optical disk support roller 111 or the working surface 114*a* of the optical disk support plate 114 when transferring the image receptive layer 123 to the optical disk 141 by the image receptive layer transfer unit 109. Fragments of the image receptive layer 123 sticking to the respective working surfaces 111*a* and 114*a* of the optical disk support roller 111 and the optical disk support plate 114 deteriorate the working surfaces 111*a* and 114*a* and cause adverse effect such that the image receptive layer 123 cannot be uniformly transferred to the optical disk 141, the intermediate transfer medium 121 and the optical disk 141 cannot be regularly conveyed, and the recording surface of the optical disk 141 is damaged. The optical disk support roller 111 and the optical disk support plate 114 may be formed of a lubricant material, such as silicone rubber or the like or a lubricant layer, such as silicone rubber layer or the like, may be formed over the working surfaces 111*a* and 114*a* to avoid such troubles attributable to fragments of the image receptive layer 123 sticking to the working surfaces 11*a* and 114*a*.

The foregoing image forming method of the present invention transfers the image receptive layer 123 directly to the optical disk 141. However, when the adhesion of the image receptive layer 123 to the optical disk 141 is not sufficiently high, the image receptive layer 123 may be bonded to the optical disk 141 by the adhesive layer 53 (FIG. 6). The adhesive layer 53 may be formed over the image receptive layer 123 of the intermediate transfer medium 121 carrying the image or over the optical disk 141. The adhesive layer 53 may be formed by any suitable process, such as a coating process or a transfer process.

Preferably, the adhesive layer 53 is formed of a thermosensitive adhesive material, such as a thermoplastic resin, a natural resin, rubber or a wax. More concretely, materials suitable for forming the adhesive layer 53 are cellulose derivatives including ethyl cellulose and cellulose acetate propionate, styrene resins including polystyrene resins and methyl styrene resins, acrylic resins including polyethyl methacrylate resins, polymethyl methacrylate resins and polyacrylic ethyl resins, vinyl resins including polyvinyl chloride resins, polyvinyl acetate resins, copolymers of vinyl chloride and vinyl acetate, and polyvinyl butyral resins, and natural and synthetic resins including polyester resins, polyamide resins, epoxy resins, polyurethane resins, ionomers, copolymers of ethylene and acrylic acid and copolymers of ethylene and acrylic ester, and natural resins and derivatives of synthetic rubbers as tackifiers including rosin, rosin-denatured maleic resins, ester gum, polyisobutylene rubber, butyl rubber, styrene-butadiene rubber, butadiene acrylonitrile rubber, poliamide resins and chlorinated polyolefin resins. The adhesive layer 53 may be formed of one of those materials or a composite of some of those materials.

Usually, the surfaces of a compact disk among optical disks are coated with an evaporated metal film, such as an aluminum film or a gold film, and have a metallic sheen. Therefore, the adhesive layer may be formed in white or some color or a color layer may be combined with the adhesive layer to conceal the metallic sheen so that the image look more clearer.

Intermediate transfer media and thermal transfer sheets applicable to the present invention will be described below.

Figure 21:
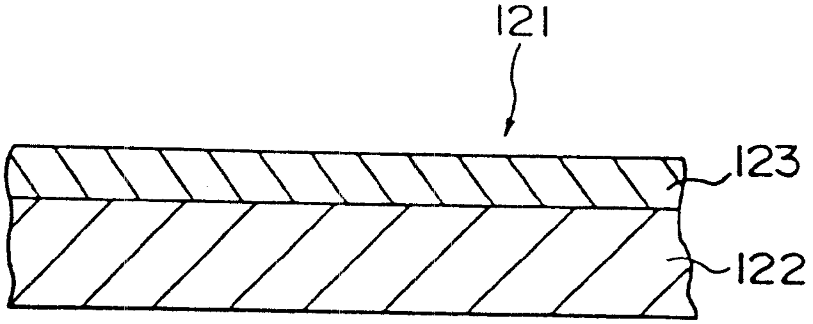
FIG. 21 is a typical sectional view of an intermediate transfer medium embodying the present invention.
Figure 22:
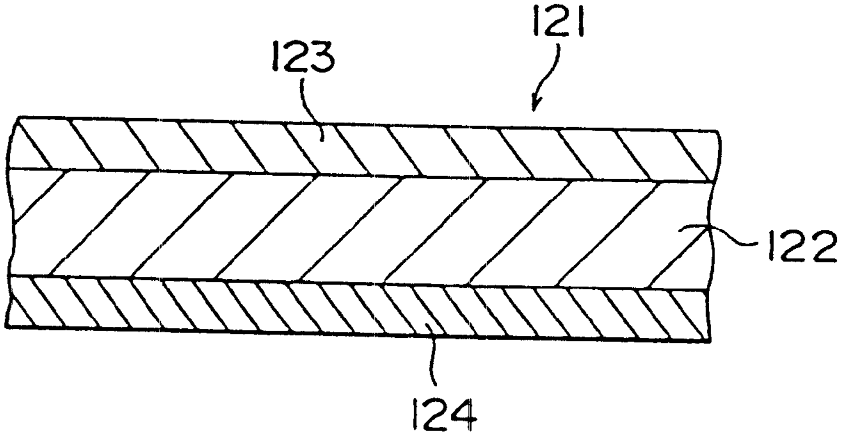
FIG. 22 is a typical sectional view of an intermediate transfer medium embodying the present invention.
Figure 23:
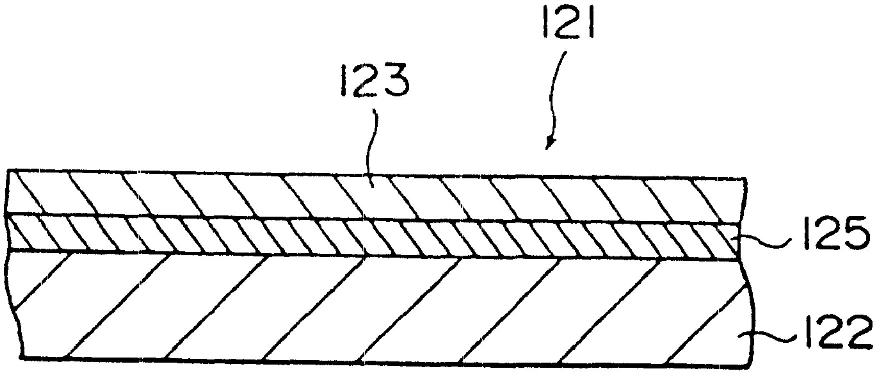
FIG. 23 is a typical sectional view of an intermediate transfer medium embodying the present invention.
Figure 24:
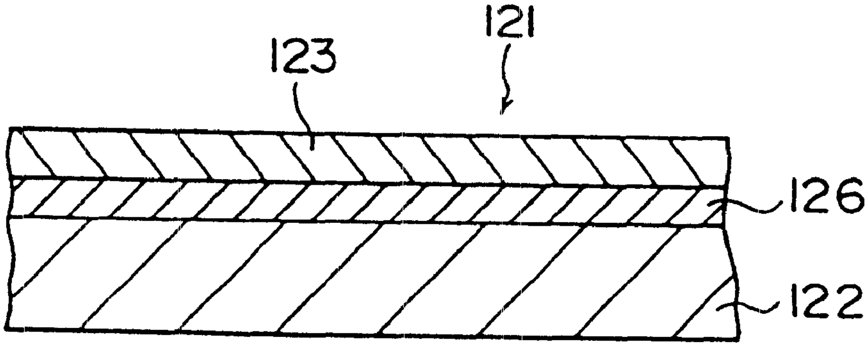
FIG. 24 is a typical sectional view of an intermediate transfer medium embodying the present invention.

The present invention may employ any one of an intermediate transfer medium 121 shown in FIG. 21 comprising a base sheet 122 and an image receptive layer 123 formed on one surface of the base sheet 122, an intermediate transfer sheet 121 shown in FIG. 22 comprising a base sheet 22, an image receptive layer 123 formed on one of the surfaces of the base sheet, and a back layer 124 formed on the other surface of the base sheet 122, an intermediate transfer sheet comprising a base sheet 122, a separating layer 125 formed on one surface of the base sheet 122, and an image receptive layer 23 formed on the separating layer 125, and an intermediate transfer sheet 121 shown in FIG. 24 comprising a base sheet 122, an image protecting layer 126 formed on one surface of the base sheet 122, and an image receptive layer 123 formed on the image protective layer 126.

The base sheet 122 of each of those intermediate transfer media 121 may be a sheet having microvoids, such as a synthetic paper sheet of a polyolefin resin or a polystyrene resin or a sheet used as the base sheet of conventional thermal transfer sheets and there is no particular restriction on the base sheet 122. More concretely, preferable sheets as the base sheet 122 are, for example, thin paper sheets, such as glassine paper sheets, condenser paper sheets and paraffin paper sheets, oriented or nonoriented films of heat-resistant polyesters, such as polyethylene terephthalate, polyethylene naphthalate, polybutylene terephthalate, polyphenylene sulfite, polyether ketone and polyether sulfone, polypropylene, polycarbonate, cellulose acetate, derivatives of polyethylene, polyvinyl chloride, polyvinylidene chloride, polystyrene, polyamide, polyimide, polymethyl-pentene and ionomer, and composite films of those materials. The thickness of the base sheet 122 is dependent on the properties of the material and is determined so that the base sheet 122 has appropriate properties including strength thermal conductivity and heat resistance. Ordinarily, the thickness of the base sheet 122 is in the range of about 1 to about 100 μm.

The image receptive layer 123 of the intermediate transfer medium 121 contains at least a binder resin. Additive agents including a lubricant may be added to the image receptive layer 123 when necessary. It is preferable to form the image receptive layer 123 of a binder resin easy to dye with a sublimable dye. Preferable binder resins for forming the image receptive layer 123 are polyolefin resins, such as a polypropylene resin, halogenated resins, such as a polyvinyl chloride resin and a polyvinylidene chloride resin, vinyl resins, such as a polyvinyl acetate resin, polyacrylic ester resin and a copolymer of vinyl chloride and vinyl acetate, polyester resins, such as a polyethylene terephthalate resin and a polybutylene terephthalate resin, polystyrene resins, polyamide resins, copolymers of olefin, such as ethylene and propylene, and a vinyl monomer, ionomers, and cellulose derivatives. Among those materials, vinyl resins and polyester resins are particularly preferable.

When the image receptive layer 123 transferred to the optical disk 141 is bonded adhesively to the optical disk 141 by an adhesive layer 53 as mentioned above, the image receptive layer 123 need not necessarily be formed of a thermosensitive adhesive material and hence the image receptive layer 123 may be formed of a resin difficult to soften by heat. Preferably, a lubricant is mixed into the resin forming the image receptive layer 123 to prevent the fusion of the image receptive layer 123 and adhesion of the fused image receptive layer 123 to the thermal transfer sheet 131. Suitable lubricants are silicone oil, phosphatic surface-active agents and fluorine compounds. Among those lubricants, silicone oil is most preferable. A preferable composition of the material forming the image receptive layer 33 is 0.2 to 30 parts by weight lubricant and 100 parts by weight binder resin. The image receptive layer 123 can be formed by spreading an ink prepared by dissolving or dispersing a mixture of the resin and necessary additive agents including a lubricant in a solvent, such as water or an organic solvent, over the surface of the base sheet 122 by an ordinary coating process, such as a coating process using a bar coater, a gravure printing process, a screen printing process, a reverse roll coating process using a gravure printing plate or the like. Desirably, the thickness of the image receptive layer 123 as dried is in the range of 1 to 10 μm.

The back layer 124 of the intermediate transfer sheet 121 is formed on the back surface of the base sheet 122 to prevent the fusion of the base sheet 122 by the thermal head (heating device) and the adhesion of the fused base sheet 122 to the thermal head and to ensure the smooth travel of the intermediate transfer sheet 121. Preferable materials for forming the back layer 124 are natural resins and synthetic resins including, for example, cellulose resins, such as ethyl cellulose, hydroxyethyl cellulose, hydroxypropyl cellulose, methyl cellulose, cellulose acetate, cellulose acetate butyrate and nitrocellulose, vinyl resins, such as polyvinyl alcohol resins, polyvinyl acetate resins, polyvinyl butyral resins, polyvinyl acetal resins and polyvinyl pyrrolidone resins, acrylic resins, such as polymethyl methacrylate resins, polyethyl acrylate resins, polyacrylamide resins and styrene-acrylonitrile copolymers, polyamide resins, polyvinyl toluene resins, coumarone-indene resins, polyester resins, polyurethane resins, and silicone- or fluorine-denatured urethaneresins. To give the back layer 124 an enhanced heat resistance, it is preferable to use a resin having reactive hydroxyl groups and a crosslinking agent, such as polyisocyanate, in combination to form the back layer of a crosslinked resin.

The material forming the back layer 124 may contain a solid or liquid lubricant, such as a mold lubricant, to reduce the friction between the thermal head and the back layer 124 and to enhance the heat resistance of the back layer 124. Suitable lubricants are, for example, waxes, such as a polyethylene wax and a paraffin wax, higher aliphatic alcohols, organopolysiloxane, anionic surface-active agents, cationic surface-active agents, amphorteric surface-active agents, nonionic surface-active agents, fluorine surface-active agents, organic carbonxylic acids, derivatives of organic carboxylic acids, fluororesins, silicone resins, and fine particles of inorganic compounds, such as talc and silica. The preferable lubricant content of the material forming the back layer 124 is in the range of 5 to 50 wt. %, preferably, about 10 to about 30 wt. %. Preferably, the thickness of the back layer 124 is in the range of about 0.1 to about 10 μm.

The separating layer 125 sandwiched between the base sheet 122 and the image receptive layer 123 facilitates the separation of the image receptive layer 123 from the base sheet 122. The separating layer 125 remains on the base sheet 122 after the image receptive layer 123 has been transferred. The separating layer 125 is formed of a composite material prepared by mixing a binder resin and, when necessary, a lubricating material, or a resin having a lubricating property.

When forming the separating layer 125 of a material containing a binder resin and a lubricant, suitable binder resins are thermoplastic resins, such as acrylic resins including polymethyl methacrylate resins, polyethyl methacrylate resins and polybutyl acrylate resins, vinyl resins including polyvinyl acetate resins, copolymers of vinyl chloride and vinyl acetate, polyvinyl alcohol resins and polyvinyl butyral resins, and cellulose derivatives including ethyl cellulose, nitrocellulose and cellulose acetate; and thermosetting resins including unsaturated polyester resins, polyester resins, polyurethane resins and aminoalkyd resins. Suitable lubricants are waxes, silicone waxes, silicone resins, melamine resins, fluororesins, talc, fine silica powder, surface-active agents and metallic soaps. The separating layer 125 is formed of one or a plurality of those resins containing suitable one of those lubricants by a method similar to that of forming the image receptive layer 123. Preferably, the thickness of the separating layer 125 is in the range of 0.1 to 5 μm.

When forming the separating layer 125 of a resin having a lubricating property, the resin may be a silicone resin, a melamine resin, a fluororesin or a graft copolymer obtained by grafting lubricating segments, such as polysiloxane segments or carbon fluoride segments to the molecules of an acrylic resin, a vinyl resin, polyester resin or the like. Such a separating layer 125 is formed of one or a plurality of those resins containing suitable one of those lubricants by a method similar to that of forming the image receptive layer 123. Preferably, the thickness of the separating layer 125 is in the range of 0.1 to 5 μm.

The image protecting layer 126 sandwiched between the base sheet 122 and the image receptive layer 123 protects the image receptive layer 123 carrying an image and transferred to the optical disk 141. The image protective layer 126, when transferred together with the image receptive layer 123 to the optical disk 141, overlies the image receptive layer 123 to enhance the weatherability, the fingerprint removability and the chemical resistance of the image.

The material forming the image protecting layer 126 contains at least a binder resin. The composition of the resin for forming the image protecting layer 126 is selectively determined so that the image protective layer 126 is properly separable from the base sheet 122, and has desired physical properties as a protective layer for protecting the surface of the image receptive layer 123 after being transferred together with the image receptive layer 123 to the optical disk 141. Generally, the image protecting layer 126 is formed of any one of thermoplastic resins, such as cellulose derivatives including ethyl cellulose, nitrocellulose and cellulose acetate, acrylic resins including polymethyl methacrylate resins, polyethyl methacrylate resins and polybutyl acrylate resins, and vinyl polymers including polyvinyl chloride resins, copolymers of vinyl chloride and vinyl acetate and polyvinyl butyral resins; and thermosetting resins, such as unsaturated polyester resins, polyurethane resins and aminoalkyd resins. When the label formed by transferring the image receptive layer 123 to the optical disk 141 needs to have abrasion resistance, chemical resistance and antifouling property, the image protecting layer 126 may be formed of a radiation-setting resin. The resin for forming the image protecting layer 126 may contain a lubricant for enhancing the abrasion resistance of the label, a surface-active agent for preventing fouling, an ultraviolet absorbing agent for enhancing weathering resistance and an oxidation inhibitor. The image protecting layer 126 can be formed by a method similar to that of forming the image receptive layer 123. Preferably, the thickness of the image protecting layer 126 is in the range of 0.1 to 20 μm.

The thermal transfer sheet 131 applicable to the present invention will be described hereinafter. The thermal transfer sheet 131 may be of either of the hot-melt transfer type and the hot-sublimation transfer type.

The hot-melt transfer type thermal transfer sheet 131 is formed by forming the color layer 133 of a hot-melt ink on the base sheet 132, such as a plastic sheet. The hot-sublimation transfer type thermal transfer sheet 131 is formed by forming the color layer 133 of a material prepared by dissolving or dispersing a sublimable dye, i.e., a coloring matter, in a binder resin on the base sheet 132. The base sheet 132 of the thermal transfer sheet 131 may be the same as the base sheet 122 of the intermediate transfer medium 121 and the thickness of the base sheet 132 is, preferably, in the range of about 1 to about 100 μm.

The color layer 133 of the hot-melt transfer type thermal transfer sheet 131 is formed of a mixture of a coloring matter, such as a pigment or a dye, and a wax or a thermoplastic resin.

The color layer 133 of the hot-sublimation transfer type thermal transfer sheet 131 is formed of a mixture of a sublimable dye and a binder resin. The sublimable dye is caused to sublimate and migrate by heat to form an image. There is no particular restriction on the type of the sublimable dye; dyes suitable for forming conventional thermal transfer sheets may be used. Preferable resins as the binder resin are, for example, cellulose resins including ethyl cellulose, hydroxyethyl cellulose, hydroxypropyl cellulose, methyl cellulose, cellulose acetate and cellulose acetate butyrate, vinyl resins including polyvinyl alcohol resins, polyvinyl acetate resins, polyvinyl butyral resins, polyvinyl acetal resins, polyvinyl pyrrolidone resins and polyacrylamide resins, and polyester resins. In view of heat resistance and dye transfer performance, cellulose resins, acetal resins, butyral resins and polyester resins among those resins are particularly preferable. When necessary, the color layer 133 may contain known additives in addition to the dye and the binder resin.

The surface of the base sheet 132 of the thermal transfer sheet 131 opposite the surface on which the color layer 133 is formed may be coated with the back layer 24 (FIG. 1) to prevent the fusion of the base sheet 132 by the thermal head (heating device) and the adhesion of the fused base sheet 132 to the thermal head and to ensure the smooth travel of the thermal transfer sheet 131. A method of forming the back layer 24 is the same as that of forming the back layer 124 of the intermediate transfer medium 121 and hence the description thereof will be omitted.

According to the present invention, the hot-melt transfer type thermal transfer sheets 131 can be used in an image forming processes using the hot-sublimation transfer type thermal transfer sheets 131.

The optical disks 141 on which images are to be transferred by the thermal transfer image forming method of the present invention include compact disks, laser disks, magnetooptic disks and phase change optical disks. Although a principal material for forming compact disks is a polycarbonate resin and a principal material for forming magnetooptic disk is glass, there is no particular restriction on materials for forming the optical disks of the present invention. The image forming method of the present invention is capable of forming a clear, highly sharp image including pictures, characters and/or symbols, on one of the surfaces or both the surfaces of an optical disk regardless of the material forming the optical disk.

As is apparent from the foregoing description, according to the present invention, the thermomigratory coloring matter contained in the color layer of the thermal transfer sheet is transferred to the image receptive layer of the intermediate transfer medium to form an image including patterns, characters, symbols and such by selectively energizing the heating elements of the thermal head according to image data, and the image receptive layer carrying the image is transferred to an optical disk to form a label by the heating device provided with a thermal head, a line heater, a heat roller heated at a surface temperature in the range of 50 to 200° C. and operating at a surface speed in the range of 5 to 100 mm/sec or a hot stamper heated at a surface temperature in the range of 50 to 200° C., capable of applying a pressure in the range of 0.1 to 5.0 kg/cm$^2$ for a time period in the range of 0.3 to 20 sec. Accordingly, a clear, highly sharp full-color image or the like, which could not have been formed by the conventional screen printing process and the offset printing process, can be formed on the optical disk without damaging the optical disk without increasing the costs and reducing the productivity even if the image needs to be formed on a small lot of optical disks.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of forming an image on an optical disk comprising the steps of:

preparing a thermal transfer sheet comprising a thermal transfer base sheet and at least a color layer formed on one surface of the thermal transfer base sheet, and an intermediate transfer medium comprising an intermediate transfer base sheet and at least an image receptive layer formed on one surface of the intermediate transfer base sheet;

forming the image on the image receptive layer of the intermediate transfer medium by laying the thermal transfer sheet and the intermediate transfer medium one on top of the other with the color layer and the image receptive layer in close contact with each other, compressing the thermal transfer sheet and the intermediate transfer medium between a thermal head and a platen roller, and selectively energizing heating elements of the thermal head according to image data to transfer a thermomigratory coloring matter contained in the color layer of the thermal transfer sheet from the color layer of the thermal transfer sheet to the image receptive layer of the intermediate transfer medium; and transferring the image receptive layer carrying the image from the intermediate thermal transfer medium to the optical disk by heating the intermediate transfer medium pressed against the optical disk, wherein the step of transferring the image receptive layer carrying the image to the surface of the optical disk comprises pressing the intermediate transfer medium against the optical disk and heating the intermediate transfer medium with a heat roller having a pattern corresponding to that of the optical disk.

2. A method of forming an image on an optical disk, according to claim 1, wherein the intermediate transfer medium is pressed against the optical disk and heated with the heat roller having a surface temperature in the range of 50 to 200° C. and a surface speed in the range of 5 to 100 nun/sec.

3. A method of forming an image on an optical disk, according to claim 1, wherein the heat roller and the optical disk are set in register before pressing the intermediate transfer medium against the optical disk and heating the intermediate transfer medium, and then the heat roller is rotated at the same speed as conveying speed of the optical disk.

* * * * *